United States Patent
Wei et al.

(10) Patent No.: US 12,477,589 B2
(45) Date of Patent: Nov. 18, 2025

(54) METHOD AND USER EQUIPMENT FOR PERFORMING UPLINK TRANSMISSIONS AND RELATED BASE STATION

(71) Applicant: SHARP KABUSHIKI KAISHA, Osaka (JP)

(72) Inventors: Chia-Hung Wei, Taipei (TW); Hai-Han Wang, Taipei (TW); Chie-Ming Chou, Taipei (TW); Hung-Chen Chen, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 326 days.

(21) Appl. No.: 18/098,835

(22) Filed: Jan. 19, 2023

(65) Prior Publication Data

US 2023/0247682 A1 Aug. 3, 2023

Related U.S. Application Data

(60) Provisional application No. 63/304,521, filed on Jan. 28, 2022.

(51) Int. Cl.
*H04W 74/0833* (2024.01)
*H04W 24/08* (2009.01)
*H04W 74/0838* (2024.01)

(52) U.S. Cl.
CPC ....... *H04W 74/0841* (2013.01); *H04W 24/08* (2013.01); *H04W 74/0833* (2013.01); *H04W 74/0838* (2024.01)

(58) Field of Classification Search
CPC ............... H04W 24/08; H04W 74/006; H04W 74/0833; H04W 74/0838; H04W 74/0841
See application file for complete search history.

(56) References Cited

U.S. PATENT DOCUMENTS

2015/0016312 A1* 1/2015 Li ............................. H04L 5/14
370/280
2023/0209606 A1* 6/2023 Zhang ................. H04W 74/006
370/329

FOREIGN PATENT DOCUMENTS

CN 110035555 A 7/2019

OTHER PUBLICATIONS

Qualcomm Incorporated, "4-step RACH procedure consideration", 3GPP TSG-RAN WG1 Meeting #89 Hangzhou, China, May 15-19, 2017, R1-1708575.
(Continued)

*Primary Examiner* — Kashif Siddiqui
(74) *Attorney, Agent, or Firm* — ScienBiziP, P.C.

(57) ABSTRACT

A method and a User Equipment (UE) for performing uplink transmissions and a related base station (BS) are provided. The method includes a UE receiving a Physical Random Access Channel (PRACH) configuration indicating a plurality of parameters and a first set of PRACH resources from a base station, each of the plurality of parameters corresponding to a respective one of the first set of PRACH resources; initiating a Random Access (RA) procedure; selecting a first PRACH resource from the first set of PRACH resources to transmit an RA preamble for the RA procedure, the first PRACH resource corresponding to a first parameter of the plurality of parameters; and performing Multiple-PRACH (MP) transmissions on the first PRACH resource. The first set of PRACH resources is configured for the MP transmissions and the first number of times is determined by the first parameter.

14 Claims, 15 Drawing Sheets

(56) References Cited

OTHER PUBLICATIONS

Sony, "On 4-step RACH Procedure", 3GPP TSG RAN WG1 Meeting #90 Prague, Czech Republic, Aug. 21-25, 2017, R1-1712961, p. 1, Line 10—p. 2, Line 20.

* cited by examiner

METHOD AND USER EQUIPMENT FOR PERFORMING UPLINK TRANSMISSIONS AND RELATED BASE STATION

CROSS-REFERENCE TO RELATED APPLICATION(S)

The present disclosure claims the benefit of and priority to U.S. Provisional Patent Application Ser. No. 63/304,521, filed on Jan. 28, 2022, entitled "ENHANCED MULTIPLE PRACH TRANSMISSION IN NEW RADIO," the content of which is hereby incorporated fully by reference into the present disclosure for all purposes.

FIELD

The present disclosure generally relates to wireless communication and, more particularly, to a method and a User Equipment (UE) for performing uplink transmissions and a related Base Station (BS).

BACKGROUND

At least some of the acronyms in the present application are defined as follows and, unless otherwise specified, the acronyms have the following meanings:

| Abbreviation | Full name |
| --- | --- |
| 3GPP | 3rd Generation Partnership Project |
| 5G | 5th Genreation |
| 5GC | 5G Core |
| AM | Acnowledge Mode |
| AS | Access Stratum |
| BA | Bandwidth Aggregation |
| BFR | Beam Failure Recovery |
| BS | Base Station |
| BSR | Buffer Status Reporting |
| BWP | Band Width Part |
| CA | Carrier Aggregation |
| CBRA | Contention-Based Random Access |
| CC | Component Carriers |
| CCCH | Common Control Channel |
| CE | Control Element |
| CFRA | Contention-Free Random Access |
| CG | Cell Group |
| CORESET | Control Resource Set |
| C-RNTI | Cell Radio Network Temporary Identifier |
| CS-RNTI | Configured Scheduling Radio Network Temporary Identifier |
| CSI | Channel State Information |
| CSI-RS | Channel State Information Reference Singal |
| CQI | Channel Quality Indicator |
| DC | Dual Connectivity |
| DCI | Downlink Control Information |
| DL | Downlink |
| DL-SCH | Downlink Shared Channel |
| DTCH | Dedicated Traffic Channel |
| DRB | Data Radio Bearer |
| eMBB | Enhanced Mobile Broadband |
| EN-DC | E-UTRA NR Dual Connectivity |
| gNB | Next Generation Node B |
| HO | Handover |
| IE | Information Element |
| L1 | Layer 1 |
| L2 | Layer 2 |
| LCH | Logical Channel |
| LCID | Logical Channel Identity |
| LTE | Long Term Evolution |
| MAC | Medium Access Control |
| MCG | Master Cell Group |
| MCS-C-RNTI | Modulation Coding Scheme Cell Radio Network Temporary Identifier |
| MIMO | Multi-Input Multi-Output |
| mMTC | massive Machine Type Communications |
| MSG0 | Message-0 |
| MSG1 | Message-1 |
| MSG2 | Message-2 |
| MSG3 | Message-3 |
| MSG4 | Message-4 |
| MSGA | Message-A |
| MSGB | Message-B |
| NAS | Non-Access Stratum |
| NDI | New Data Indicator |
| NG-C | Next-Generation Core |
| NR | New Radio |
| NUL | Normal Uplink |
| PCell | Primary Cell |
| PDCCH | Physical Downlink Control Channel |
| PDCP | Packet Data Convergence Protocol |
| PDU | Protocol Data Unit |
| PHY | Physical |
| PRACH | Physical Random Access Channel |
| PSCell | Primary SCell |
| PUCCH | Physical Uplink Control Channel |
| PUSCH | Physical Uplink Shared Channel |
| QoS | Quality of Service |
| RA | Random Access |
| RAT | Radio Access Technology |
| RACH | Random Access Channel |
| RAR | Random Access Response |
| Rel-15 | Release 15 |
| Rel-16 | Release 16 |
| RLC | Radio Link Control |
| RLF | Radio Link Failure |
| RNTI | Radio Network Temporary Identifier |
| RRC | Radio Resource Control |
| RRM | Radio Resource Management |
| RS | Reference Signal |
| RSRP | Reference Signal Received Power |
| RTT | Round Trip Time |
| Rx | Receiving |
| SCell | Secondary Cell |
| SCG | Secondary Cell Group |
| SDU | Service Data Unit |
| SI | System Information |
| SIB | System Information Block |
| SINR | Signal to Interference and Noise Ratio |
| SLIV | Start and Length Indicator Value |
| SR | Scheduling Request |
| SRB | Signaling Radio Bearer |
| SRS | Sounding Reference Signal |
| SSB | Synchronization Signal Block |
| SpCell | Special Cell |
| SUL | Supplementary Uplink |
| TA | Timing Advance |
| TAG | Timing Advance Group |
| TB | Transport Block |
| TAG | Timing Advance Group |
| TNL | Transport Network Layer |
| TR | Transport Report |
| TRP | Transmission/Reception Point |
| TS | Technical Specification |
| Tx | Transmitting |
| UE | User Equipment |
| UL | Uplink |
| UL-SCH | Uplink Shared Channel |
| URLLC | Ultra-Reliable and Low-Latency Communications |

With the tremendous growth in the number of connected devices and the rapid increase in user/network traffic volume, various efforts have been made to improve different aspects of wireless communication for next-generation wireless communication systems, such as fifth-generation (5G) New Radio (NR), by improving data rate, latency, reliability, and mobility.

The 5G NR system is designed to provide flexibility and configurability to optimize network services and types, thus accommodating various use cases, such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communications in next-generation wireless communication systems.

SUMMARY

The present disclosure is directed to a method and a User Equipment (UE) for performing uplink transmissions and a related Base Station (BS).

According to a first aspect of the present disclosure, a method performed by a User Equipment (UE) for performing uplink transmissions is provided. The method includes receiving a Physical Random Access Channel (PRACH) configuration indicating a plurality of parameters and a first set of PRACH resources from a base station, each of the plurality of parameters corresponding to a respective one of the first set of PRACH resources; initiating a Random Access (RA) procedure; selecting a first PRACH resource from the first set of PRACH resources to transmit an RA preamble for the RA procedure, the first PRACH resource corresponding to a first parameter of the plurality of parameters; and performing Multiple-PRACH (MP) transmissions on the first PRACH resource. The MP transmissions include transmitting the RA preamble a first number of times before the UE begins monitoring for a Random Access Response (RAR) that corresponds to the RA preamble. The first set of PRACH resources is configured for the MP transmissions and the first number of times is determined by the first parameter.

In some implementations of the first aspect of the present disclosure, the PRACH configuration further indicates a second set of PRACH resources that is configured for a Single-PRACH (SP) transmission including transmitting the RA preamble only once before the UE begins monitoring for the RAR that corresponds to the RA preamble.

In some implementations of the first aspect of the present disclosure, the PRACH configuration is configured on a per-Downlink (DL)-Reference-Signal (RS) basis.

In some implementations of the first aspect of the present disclosure, the method further includes measuring a plurality of Downlink (DL) Reference Signals (RSs) to obtain a plurality of Reference Signal Received Power (RSRP) values; and selecting, among the plurality of DL RSs, a DL RS for the RA procedure after determining that all of the plurality of RSRP values are less than an RSRP threshold; and transmitting the RA preamble on the first PRACH resource associated with the DL RS selected for the RA procedure.

In some implementations of the first aspect of the present disclosure, a second PRACH resource of the first set of PRACH resources corresponds to a second parameter of the plurality of parameters, and the second parameter indicates a second number of times to transmit the RA preamble, with the first parameter indicating the first number of times to transmit the RA preamble, the first number of times being different from the second number of times.

In some implementations of the first aspect of the present disclosure, the method further includes receiving a plurality of Reference Signal Received Power (RSRP) thresholds from the base station; measuring a Downlink (DL) Reference Signal (RS) to obtain an RSRP value, the DL RS associated with the first set of PRACH resources; and comparing the RSRP value with the plurality of RSRP thresholds to select the first PRACH resource, from the first set of PRACH resources, for the MP transmissions.

In some implementations of the first aspect of the present disclosure, the method further includes determining whether to change from the first PRACH resource to a second PRACH resource of the first set of PRACH resources for transmitting the RA preamble according to at least one of: a number of rounds in which the UE performs the MP transmissions, and whether the MP transmissions performed in two consecutive rounds are associated with a same DL RS.

In some implementations of the first aspect of the present disclosure, the method further includes receiving a counter threshold for configuring a counter from the base station; monotonically changing a value of the counter after determining that the MP transmissions performed in two consecutive rounds are associated with the same DL RS; and selecting the second PRACH resource for transmitting the RA preamble after determining that the value of the counter has reached the counter threshold.

In some implementations of the first aspect of the present disclosure, a transmission power of transmitting the RA preamble on the second PRACH resource is higher than a transmission power of transmitting the RA preamble on the first PRACH resource.

According to a second aspect of the present disclosure, a User Equipment (UE) for performing uplink transmissions is provided. The UE includes at least one processor and at least one memory coupled to the at least one processor. The at least one memory stores at least one computer-executable instruction that, when executed by the at least one processor, causes the UE to: receive a Physical Random Access Channel (PRACH) configuration indicating a plurality of parameters and a first set of PRACH resources from a base station, each of the plurality of parameters corresponding to a respective one of the first set of PRACH resources; initiate a Random Access (RA) procedure; select a first PRACH resource from the first set of PRACH resources to transmit an RA preamble for the RA procedure, the first PRACH resource corresponding to a first parameter of the plurality of parameters; and perform Multiple-PRACH (MP) transmissions on the first PRACH resource. The MP transmissions include transmitting the RA preamble a first number of times before the UE begins monitoring for a Random Access Response (RAR) that corresponds to the RA preamble. The first set of PRACH resources is configured for the MP transmissions and the first number of times is determined by the first parameter.

In some implementations of the second aspect of the present disclosure, the PRACH configuration further indicates a second set of PRACH resources that is configured for a Single-PRACH (SP) transmission including: transmitting the RA preamble only once before the UE begins monitoring for the RAR that corresponds to the RA preamble.

In some implementations of the second aspect of the present disclosure, the PRACH configuration is configured on a per-Downlink (DL)-Reference-Signal (RS) basis.

In some implementations of the second aspect of the present disclosure, the at least one computer-executable instruction, when executed by the at least one processor, further causes the UE to: measure a plurality of Downlink (DL) Reference Signals (RSs) to obtain a plurality of Reference Signal Received Power (RSRP) values; and select, among the plurality of DL RSs, a DL RS for the RA procedure after determining that all of the plurality of RSRP values is less than an RSRP threshold; and transmit the RA preamble on the first PRACH resource associated with the DL RS selected for the RA procedure.

In some implementations of the second aspect of the present disclosure, a second PRACH resource of the first set of PRACH resources corresponds to a second parameter of the plurality of parameters, and the second parameter indicates a second number of times to transmit the RA preamble, with the first parameter indicating the first number of times to transmit the RA preamble, the first number of times being different from the second number of times.

In some implementations of the second aspect of the present disclosure, the at least one computer-executable instruction, when executed by the at least one processor, further causes the UE to: receive a plurality of Reference Signal Received Power (RSRP) thresholds from the base station; measure a Downlink (DL) Reference Signal (RS) to obtain an RSRP value, the DL RS associated with the first set of PRACH resources; and compare the RSRP value with the plurality of RSRP thresholds to select the first PRACH resource, from the first set of PRACH resources, for the MP transmissions.

In some implementations of the second aspect of the present disclosure, the at least one computer-executable instruction, when executed by the at least one processor, further causes the UE to: determine whether to change from the first PRACH resource to a second PRACH resource of the first set of PRACH resources for transmitting the RA preamble according to at least one of: a number of rounds in which the UE performs the MP transmissions, and whether the MP transmissions performed in two consecutive rounds are associated with a same DL RS.

In some implementations of the second aspect of the present disclosure, the at least one computer-executable instruction, when executed by the at least one processor, further causes the UE to: receive a counter threshold for configuring a counter from a base station; monotonically change a value of the counter after determining that the MP transmissions performed in two consecutive rounds are associated with the same DL RS; and select the second PRACH resource for transmitting the RA preamble after determining that the value of the counter has reached the counter threshold.

In some implementations of the second aspect of the present disclosure, a transmission power of transmitting the RA preamble on the second PRACH resource is higher than a transmission power of transmitting the RA preamble on the first PRACH resource.

According to a third aspect of the present disclosure, a Base Station (BS) for communicating with a User Equipment (UE) performing uplink transmissions is provided. The BS includes at least one processor and at least one memory coupled to the at least one processor. The at least one memory stores at least one computer-executable instruction that, when executed by the at least one processor, causes the UE to: transmit a Physical Random Access Channel (PRACH) configuration indicating a plurality of parameters and a first set of PRACH resources to the UE, each of the plurality of parameters corresponding to a respective one of the first set of PRACH resources; cause the UE to select a first PRACH resource from the first set of PRACH resources to transmit a Random Access (RA) preamble for an RA procedure, the first PRACH resource corresponding to a first parameter of the plurality of parameters; and receive, from the UE, the RA preamble on the first PRACH resource a first number of times in response to the UE performing Multiple-PRACH (MP) transmissions, wherein the first set of PRACH resources is configured for the UE to perform the MP transmissions and the first number of times is determined by the first parameter.

In some implementations of the third aspect of the present disclosure, the PRACH configuration is configured on a per-Downlink (DL)-Reference-Signal (RS) basis.

BRIEF DESCRIPTION OF THE DRAWINGS

Aspects of the example disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
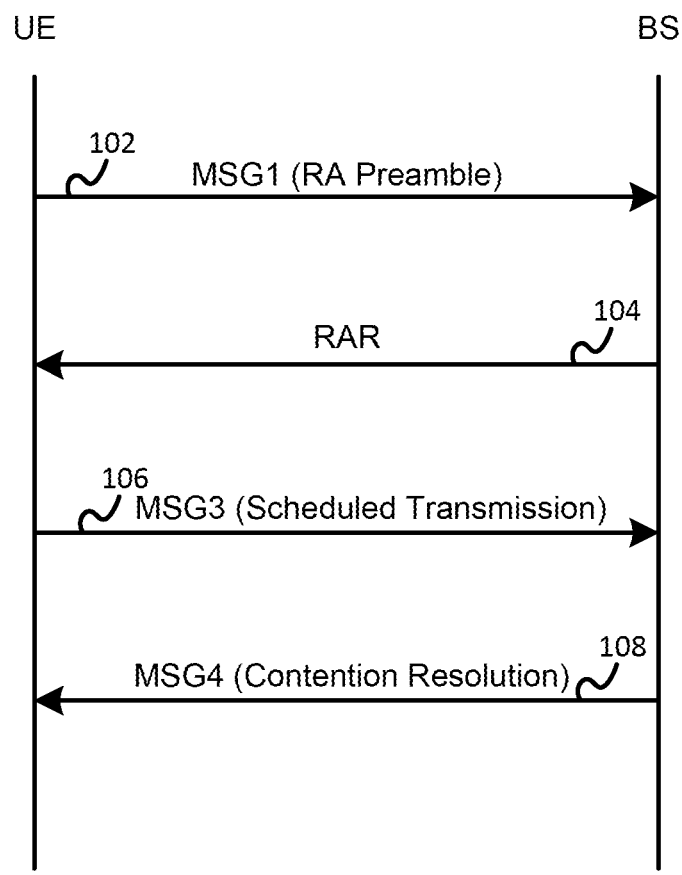
FIG. 1 is a sequence diagram illustrating a CBRA procedure according to an implementation of the present disclosure.

The following contains specific information related to implementations of the present disclosure. The drawings and their accompanying detailed description are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purposes of consistency and ease of understanding, like features may be identified (although, in some examples, not illustrated) by the same numerals in the drawings. However, the features in different implementations may differ in other respects and shall not be narrowly confined to what is illustrated in the drawings.

The phrases "in some implementations" or "In some implementations" may each refer to one or more of the same or different implementations. The term "coupled" is defined as connected, whether directly or indirectly via intervening components, and is not necessarily limited to physical connections. The term "comprising" means "including, but not necessarily limited to" and specifically indicates open-ended inclusion or membership in the disclosed combination, group, series, or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for disclosing associated objects and represents that three relationships may exist such that A and/or B may indicate that A exists alone, A and B exist at the same time, or B exists alone. "A and/or B and/or C" may represent that at least one of A, B, and C exists. The character "/" generally represents that the associated objects are in an "or" relationship.

For the purposes of explanation and non-limitation, specific details, such as functional entities, techniques, protocols, standards, and the like, are set forth for providing an understanding of the disclosed technology. In other examples, detailed disclosures of well-known methods, technologies, systems, architectures, and the like are omitted so as not to obscure the present disclosure with unnecessary details.

Persons skilled in the art will immediately recognize that any disclosed network function(s) or algorithm(s) may be implemented by hardware, software, or a combination of software and hardware. Disclosed functions may correspond to modules which may be software, hardware, firmware, or any combination thereof.

A software implementation may include computer-executable instructions stored on a computer-readable medium, such as memory or other type of storage devices. One or more microprocessors or general-purpose computers with communication processing capability may be programmed with corresponding computer-executable instructions and perform the disclosed network function(s) or algorithm(s).

The microprocessors or general-purpose computers may include Application-Specific Integrated Circuits (ASICs), programmable logic arrays, and/or one or more Digital Signal Processors (DSPs). Although some of the disclosed implementations are oriented to software installed and executing on computer hardware, alternative implementations implemented as firmware, as hardware, or as a combination of hardware and software are well within the scope of the present disclosure. The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long-Term Evolution (LTE) system, an LTE-Advanced (LTE-A) system, an LTE-Advanced Pro system, or a 5G NR Radio Access Network (RAN) may typically include at least one base station (BS), at least one UE, and one or more optional network elements that provide connection within a network. The UE may communicate with the network, such as a Core Network (CN), an Evolved Packet Core (EPC) network, an Evolved Universal Terrestrial RAN (E-UTRAN), a Next-Generation Core (NGC), a 5G Core (5GC), or an internet via a RAN established by one or more BSs.

A UE may include, but is not limited to, a mobile station, a mobile terminal or device, or a user communication radio terminal. The UE may be a portable radio equipment that includes, but is not limited to, a mobile phone, a tablet, a wearable device, a sensor, a vehicle, or a Personal Digital Assistant (PDA) with wireless communication capability. The UE may be configured to receive and transmit signals over an air interface to one or more cells in a RAN.

The BS may be configured to provide communication services according to at least a Radio Access Technology (RAT), such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic Wideband-Code Division Multiple Access (W-CDMA), High-Speed Packet Access (HSPA), LTE, LTE-A, evolved/enhanced LTE (eLTE) that is LTE connected to 5GC, NR (often referred to as 5G), and/or LTE-A Pro. However, the scope of the present disclosure is not limited to these protocols.

The BS may include, but is not limited to, a node B (NB) in the UMTS, an evolved node B (eNB) in LTE or LTE-A, a radio network controller (RNC) in UMTS, a BS controller (BSC) in the GSM/GERAN, a next-generation eNB (ng-eNB) in an Evolved Universal Terrestrial Radio Access (E-UTRA) BS in connection with 5GC, a next-generation Node B (gNB) in the 5G-RAN (or in the 5G Access Network (5G-AN)), or any other apparatus capable of controlling radio communication and managing radio resources within a cell. The BS may serve one or more UEs via a radio interface.

The BS may provide radio coverage to a specific geographical area using a plurality of cells included in the RAN. The BS may support the operations of the cells. Each cell may be operable to provide services to at least one UE within its radio coverage.

Each cell (often referred to as a serving cell) may provide services to serve one or more UEs within its radio coverage such that each cell schedules the downlink (DL) and optionally uplink (UL) resources to at least one UE within its radio coverage for DL and optionally UL packet transmissions. The BS may communicate with one or more UEs in the radio communication system via the plurality of cells.

A cell may allocate Sidelink (SL) resources for supporting Proximity Service (ProSe), LTE SL services, LTE/NR sidelink communication services, LTE/NR sidelink discovery services, and/or LTE/NR Vehicle-to-Everything (V2X) services.

The terms, definitions, and abbreviations as given in this document are either imported from existing documentation (European Telecommunications Standards Institute (ETSI), International Telecommunication Union (ITU), or elsewhere) or newly created by 3GPP experts whenever the need for precise vocabulary is identified.

Examples of some selected terms are provided as follows.

Cell: Radio network object that can be uniquely identified by a User Equipment from a (cell) identification that is broadcast over a geographical area from one UTRAN Access Point. A Cell is either FDD or TDD mode.

Serving Cell: For a UE in the RRC_CONNECTED state not configured with CA/DC, there is only one serving cell including the primary cell. For a UE in the RRC_CONNECTED state configured with CA/DC, the term 'serving cells' is used to denote the set of cells including the Special Cell(s) and all secondary cells.

CA: In Carrier Aggregation (CA), two or more Component Carriers (CCs) are aggregated. A UE may simultaneously receive or transmit on one or multiple CCs depending on its capabilities. CA is supported for both contiguous and non-contiguous CCs. When CA is deployed, frame timing and SFN are aligned across cells that can be aggregated. The maximum number of configured CCs for a UE is 16 for DL and 16 for UL. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the Primary Cell (Pcell). Depending on UE capabilities, Secondary Cells (Scells) can be configured to form together with the Pcell a set of serving cells. The configured set of serving cells for a UE therefore may always include one Pcell and one or more Scells.

BWP: A subset of the total cell bandwidth of a cell is referred to as a Bandwidth Part (BWP) and Bandwidth Adaptation (BA) is achieved by configuring the UE with BWP(s) and telling the UE which of the configured BWPs is currently the active one. To enable BA on the Pcell, the gNB configures the UE with UL and DL BWP(s). To enable BA on Scells in case of CA, the gNB configures the UE with DL BWP(s) at least (e.g., there may be none in the UL). For the Pcell, the initial BWP is the BWP used for initial access. For the Scell(s), the initial BWP is the BWP configured for the UE to first operate at Scell activation. UE may be configured with a first active uplink BWP by a firstActiveUplinkBWP IE. If the first active uplink BWP is configured for an SpCell, the firstActiveUplinkBWP IE field contains the ID of the UL BWP to be activated upon performing the RRC (re-)configuration. If the field is absent, the RRC (re-)configuration does not impose a BWP switch. If the first active uplink BWP is configured for an Scell, the firstActiveUplinkBWP IE field contains the ID of the uplink bandwidth part to be used upon MAC-activation of an Scell.

Timer: A MAC entity can set up one or more timers for individual purposes, for example, triggering some uplink signaling retransmission or limiting some uplink signaling retransmission period. A timer is running once it is started, until it is stopped or until it expires; otherwise, it is not running. A timer can be started if it is not running or restarted if it is running. A timer is always started or restarted from its initial value. The initial value can be, but is not limited to be, configured by the gNB via downlink RRC signaling or be pre-defined/pre-determined value addressed in some specification.

PDCCH: In the downlink, the gNB can dynamically allocate resources to UEs at least via the C-RNTI/MCS-C-RNTI/CS-RNTI on PDCCH(s). A UE always monitors the PDCCH(s) in order to find possible assignments when its downlink reception is enabled (activity governed by DRX when configured). When CA is configured, the same C-RNTI applies to all serving cells. In NR wireless communication systems, a downlink data reception at the UE side is achieved by monitoring the PDCCH and finding a possible assignment. The assignment may be represented as a (UE-specific) DCI. The DCI may be found on the PDCCH via blind decoding. From the implementation of the blind decoding aspect, the UE may be configured with a set of PDCCH candidates within one or more CORESETs. The PDCCH candidate set for the UE to monitor is defined in terms of PDCCH search space sets (or search space sets). A search space set can be categorized into two types (e.g., a Common Search space (CSS) set or a UE-Specific Search Space (USS) set). That is, a UE monitors PDCCH candidates according to one or more configured search spaces sets to decode a possible PDCCH transmitted by the gNB. In other words, a PDCCH may be found in the PDCCH candidates within the monitored search space sets. More specifically, in some implementations, the UE monitors a set of PDCCH candidates in one or more CORESETs and/or Search Spaces on a DL BWP (e.g., the active DL BWP on each activated serving cell or the initial BWP on a camped cell) configured with PDCCH monitoring according to corresponding search space sets where the monitoring implies decoding each PDCCH candidate according to the monitored DCI formats. That is, the DCI with CRC bits scrambled by a UE-specific RNTI (e.g., C-RNTI) is carried by the PDCCH, and the DCI is found by the UE descrambling the CRC bits with the RNTI.

PDSCH/PUSCH: The PDCCH can be used to schedule DL transmissions on a PDSCH and UL transmissions on a PUSCH.

Transport Block: The data from the upper layer (or MAC) given to the physical layer is basically referred as a transport block.

HARQ: A functionality ensures delivery between peer entities at Layer 1 (e.g., Physical Layer). A single HARQ process supports one Transport Block (TB) when the physical layer is not configured for downlink/uplink spatial multiplexing, and when the physical layer is configured for downlink/uplink spatial multiplexing, a single HARQ process supports one or multiple TBs. There is one HARQ entity per serving cell. Each HARQ entity supports a parallel (number of) DL and UL HARQ process.

Hybrid automatic repeat request acknowledgement (HARQ-ACK): A HARQ-ACK information bit value of 0 represents a negative acknowledgement (NACK) while a HARQ-ACK information bit value of 1 represents a positive acknowledgement (ACK).

Beam: A beam may refer to a spatial (domain) filtering. In one example, the spatial filtering is applied in analog domain by adjusting a phase and/or amplitude of the signal before being transmitted by a corresponding antenna element. In another example, the spatial filtering is applied in digital domain by Multi-Input Multi-Output (MIMO) techniques in a wireless communication system. For example, "a UE made a PUSCH transmission by using a specific beam" means the UE made the PUSCH transmission by using the specific spatial/digital domain filter. The "beam" may also be, but is not limited to be, represented as an antenna, an antenna port, an antenna element, a group of antennas, a group of antenna ports, or a group of antenna elements. The beam may also be formed by a certain reference signal resource. In brief, the beam can be equivalent to a spatial domain filter through which the EM wave is radiated.

A DL RRC message in the present disclosure may be, but is not limited to, an RRC reconfiguration message (RRCReconfiguration), an RRC resume message (RRCResume), an RRC reestablishment message (RRCReestablishment), an RRC setup message (RRCSetup), or any other DL unicast RRC message.

A PDSCH/PDSCH/PUSCH transmission may span multiple of symbols in time domain. A time duration of a PDSCH/PDSCH/PUSCH (transmission) implies a time interval that starts from the beginning of the first symbol of the PDSCH/PDSCH/PUSCH (transmission) and ends at the end of the last symbol of the PDSCH/PDSCH/PUSCH (transmission).

The term "(specific) PHY layer signaling" may refer to a specific format of DCI, a specific field of DCI, a specific field of DCI with the field being set to a specific value, and/or DCI with Cyclic Redundancy Check (CRC) bits scrambled with a specific RNTI.

NR wireless communication systems were developed by 3GPP in Release 15 as one of the world's representative 5G mobile networks. NR significantly improves the performance, flexibility, scalability, and efficiency of legacy mobile networks, such as 3GPP LTE networks. By using a series of novel mechanisms introduced for NR, a BS (e.g., a gNB in NR) can provide a variety of services across different spectrum ranges, such as eMBB, URLLC, and mMTC. As defined in the 3GPP technical specification, NR can be used in two frequency ranges: Frequency Range 1 (FR1), for bands within 410 MHz to 7125 MHz, and Frequency Range 2 (FR2), for bands within 24250 MHz to 52600 MHz.

In NR, RA (or RA procedure) refers to a procedure that a UE uses to inform a gNB of the UE's presence and then to establish an RRC configuration/connection for the UE to move from an RRC_IDLE/RRC_INACTIVE state to an RRC_CONNECTED state. In addition to establishing an RRC connection with the gNB, a UE may initiate RA for other purposes, such as requesting uplink resources, requesting system information, or for beam failure recovery.

There are at least two types of RA procedure: a CBRA procedure and a CFRA procedure.

FIG. 1 is a sequence diagram illustrating a CBRA procedure according to an implementation of the present disclosure. As illustrated in FIG. 1, the CBRA procedure includes actions 102, 104, 106 and 108. In action 102 (or an RA preamble transmission step/stage), a UE may transmit a MSG1 to a BS (e.g., gNB). For example, the MSG1 transmission may include an RA preamble transmission on a PRACH. Then, the UE may monitor a response (e.g., an RAR) that corresponds to the MSG1 from the BS within a configured time window. In action 104, the BS may transmit an RAR to the UE in response to receiving the MSG1 from the UE. In action 106, after receiving the RAR, the UE may transmit a MSG3 to the BS in a scheduled transmission (e.g., scheduled by the RAR) by using a UL grant provided by the RAR. Then, the UE monitors for contention resolution from the BS. In action 108, the UE may receive a MSG4 (e.g., contention resolution) from the BS. If the contention resolution is successful, the CBRA procedure ends. If the contention resolution is not successful after one or more MSG3 (re)transmissions, the CBRA procedure may go back to action 102 in which the UE may perform the MSG1 transmission again.

Figure 2:
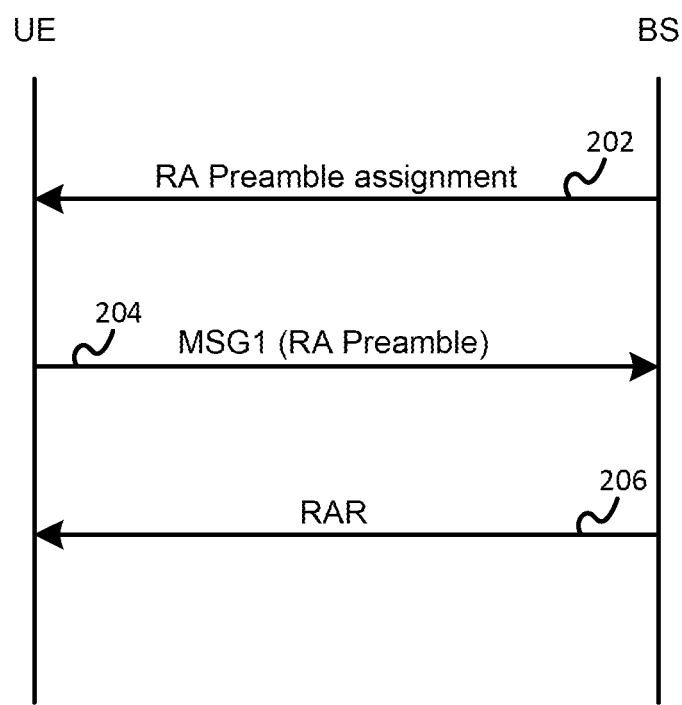
FIG. 2 is a sequence diagram illustrating a CFRA procedure according to an implementation of the present disclosure.

FIG. 2 is a sequence diagram illustrating a CFRA procedure in accordance with an implementation of the present disclosure. As illustrated in FIG. 2, a UE may receive an RA preamble assignment from a BS in action 202. The RA preamble assignment may indicate a resource allocation of an RA preamble transmission. In action 204, the UE 220 may transmit a MSG1 (e.g., including an RA preamble) according to the indicated resource allocation. In action 206, if the UE receives an RAR, as a response to the MSG1, from the BS, the CFRA procedure ends.

Operators are interested in increasing the coverage of their serving cells when commercializing a cellular communication network. Subscribers also expect ubiquitous coverage to support their desired QoS. Compared to LTE systems, NR is designed to operate at much higher frequencies, such as in FR2. Physically, the range of coverage is inversely proportional to the frequency used by the serving cell, as higher frequencies may result in stronger path loss. Therefore, a serving cell using FR2 may have a smaller range of coverage than a serving cell using FR1. Additionally, performing uplink transmissions at higher frequencies may be challenging due to the inherent limitations of battery-powered devices. For example, a PRACH may be subject to higher path loss, making it more difficult for UEs to maintain an adequate success rate for RA. RA failure is a critical issue that can significantly reduce the effective cell coverage. That is, if the BS (e.g., gNB) is unable to receive and successfully decode the PRACH transmission from a UE, it can cause RA failure. In the present disclosure, mechanisms for enhancing uplink transmission and signal transmission (including transmission on a PRACH) during RA are provided. For example, the UE may be configured with a specific PRACH resource to support Multiple PRACH (MP) transmissions, which can increase the success rate of PRACH reception on the BS side. These mechanisms can significantly increase the effective cell coverage.

In the present disclosure, a transmission on a PRACH can refer to transmitting a (RA) preamble or any other signal on a PRACH.

In order to enhance uplink transmission, an Enhanced Uplink Transmission (EUT) scheme that can be used by UEs for uplink signal transmissions is provided. In the EUT scheme, a UE may, or may be indicated by a BS to, transmit a signal (e.g., including a TB/message/data) multiple times to increase the success rate of reception on the BS side. In other words, when using the EUT scheme, a UE may transmit a specific signal multiple times in order to increase the success rate of reception on the BS side. In a legacy system, this signal would only need to be transmitted once.

When the EUT scheme is applied to an RA procedure, it can be implemented by performing a PRACH transmission multiple times. This can increase the success rate of PRACH reception on the BS side. In some implementations, performing multiple PRACH transmissions means that the UE transmits an RA preamble multiple times in each round of an RA preamble transmission step/stage during an ongoing RA procedure. For example, in a legacy system, a UE initiates an RA procedure and performs RA resource selection. The UE then transmits an RA preamble only once (referred to as Single PRACH (SP) transmission) on the selected RA resource (e.g., in action 102 of FIG. 1). The UE then begins monitoring for an RAR that corresponds to the transmitted RA preamble (e.g., in action 104 of FIG. 1). If the BS is unable to successfully receive and/or decode the transmitted RA preamble, the UE will not receive the corresponding RAR from the BS. In such a case, the UE needs to perform a random backoff and perform the next round of RA resource selection and RA preamble transmission.

In some implementations, a random backoff may include: the UE receiving a backoff parameter/value from the BS, selecting a random backoff time according to a uniform distribution between a specific value (e.g., 0) and the backoff parameter/value, and then delaying the subsequent RA preamble transmission by at least the random backoff time. The backoff parameter/value may be carried by an RAR.

When the EUT scheme is applied, the UE may transmit an RA preamble multiple times or transmit multiple RA preambles in a round of the RA preamble transmission step/stage after the RA resource selection. For example, when the EUT scheme is applied, the UE may transmit an RA preamble multiple times before monitoring an RAR corresponding the RA preamble. That is, the UE may perform a PRACH transmission multiple times before the UE starts a configured time window for monitoring the RAR corresponding to the RA preamble. In this way, the success rate of reception may be increased from the BS's perspective. In the present disclosure, performing a PRACH transmission multiple times (or Multiple PRACH (MP) transmissions) can refer to transmitting any radio signal on a PRACH multiple times in a round of the RA preamble transmission step/stage of an RA procedure. The radio signal may be, but is not limited to, an RA preamble. A UE can perform multiple PRACH transmissions to increase the success rate of reception at the BS side. In addition, the terms "multiple radio signal transmissions on a PRACH," "multiple PRACH transmissions," and "MP transmissions" can be used interchangeably in the present disclosure.

Figure 3:
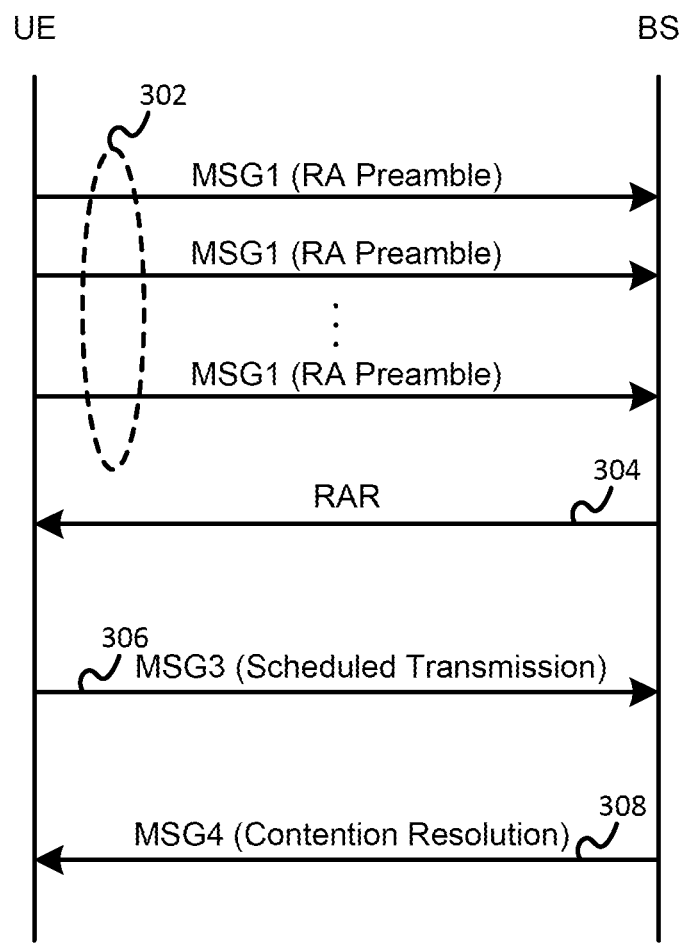
FIG. 3 is a sequence diagram illustrating an RA procedure with Multiple PRACH (MP) transmissions, according to an implementation of the present disclosure.

FIG. 3 is a sequence diagram illustrating an RA procedure with MP transmissions, according to an implementation of the present disclosure. As illustrated in FIG. 3, in action 302, MP transmissions are performed (in a single round of the RA preamble transmission step/stage). The MP transmissions may include a UE transmitting a MSG1 (which includes an RA preamble) multiple times on a PRACH resource to a BS. Action 302 may be considered as being performed in (a round of) an RA preamble transmission step/stage of an RA procedure and before the UE begins monitoring for an RAR corresponding to the transmitted MSG1/RA preamble within a configured time window.

The UE may then begin monitoring an RAR within a configured time window to see if an RAR corresponding to the transmitted MSG1 has been received. The configured time window may be determined by a timer. For example, once the timer starts, the configured time window begins; once the timer stops or expires, the configured time window ends. If the UE does not receive the corresponding RAR (e.g., indicating an RA preamble identity associated with the transmitted RA preamble/MSG1) within the configured time window, the UE may perform the next round of the RA preamble transmission step/stage. That is, the UE may perform action 302 again. In some implementations, in a new round of the RA preamble transmission step/stage, the UE may adjust at least one of the following factors to perform the PRACH transmission: the transmission power level, the RA resource, the RA preamble, the number of times the RA preamble should be transmitted in the round, and the beam.

In action 304, the BS may transmit an RAR to the UE in response to receiving the MSG1 from the UE. In action 306, after receiving the RAR, the UE may transmit a MSG3 to the BS in a scheduled transmission (e.g., scheduled by the RAR) by using a UL grant provided by the RAR. The UE then monitors for contention resolution from the BS. In action 308, the UE may receive a MSG4 (e.g., contention resolution) from the BS. If the contention resolution is successful, the RA procedure ends.

In order to apply the EUT scheme to an RA procedure, the UE may be configured with at least one specific PRACH resource. The specific PRACH resource may be, but is not limited to be, configured by the BS (e.g., gNB) for an EUT scheme or MP transmissions. If the specific PRACH resource is configured for (or specifically configured for) MP transmissions, the specific PRACH resource is also referred to as an MP-specific PRACH resource in the present disclosure.

In addition to a first PRACH resource configured for a legacy RA procedure (e.g., in which the PRACH/MSG1 transmission is implemented by an SP transmission), the UE may be further configured with a second PRACH resource that is specifically configured by the BS for the EUT scheme. In some implementations, the second PRACH resource may be independently configured and different from the PRACH resource(s) used in the legacy RA procedure without the EUT scheme. In some implementations, depending on the availability of PRACH resources, a PRACH resource configured for the EUT scheme may be used in a legacy RA procedure so that the UE may also perform the SP transmission on the PRACH resource. A PRACH resource configured for a legacy RA procedure may be used in the EUT scheme so that the UE may also perform the MP transmissions on the PRACH resource configured for the legacy RA procedure. In some implementations, the PRACH resource configured for the EUT scheme may be configured by the BS via broadcast system information or a dedicated DL RRC message that is unicast from the BS to the UE (e.g., an RRC configuration message or an RRC release message with/without a suspend configuration).

In the present disclosure, the term "MP transmissions" may refer to a UE performing multiple PRACH transmissions (or, stated alternately, a UE performing a PRACH transmission multiple times) using any of the mechanisms/methods introduced in the present disclosure. On the other hand, the term "SP transmission" may refer to a UE performing a PRACH transmission as in a legacy RA procedure (e.g., transmitting only a single RA preamble in each round of the RA preamble transmission step/stage, like action 102 in FIG. 1). In some implementations, even if the UE uses a PRACH resource configured for the EUT scheme to transmit an RA preamble in an ongoing RA procedure, the RA preamble can still be transmitted on the PRACH only once in each round of the RA preamble transmission step/stage of the ongoing RA procedure. That is, depending on the BS's implementation, the PRACH resource configured by the BS for the EUT scheme may explicitly or implicitly indicate to the UE whether it should perform a PRACH transmission only once in each round of the RA preamble transmission step/stage.

Figure 4:
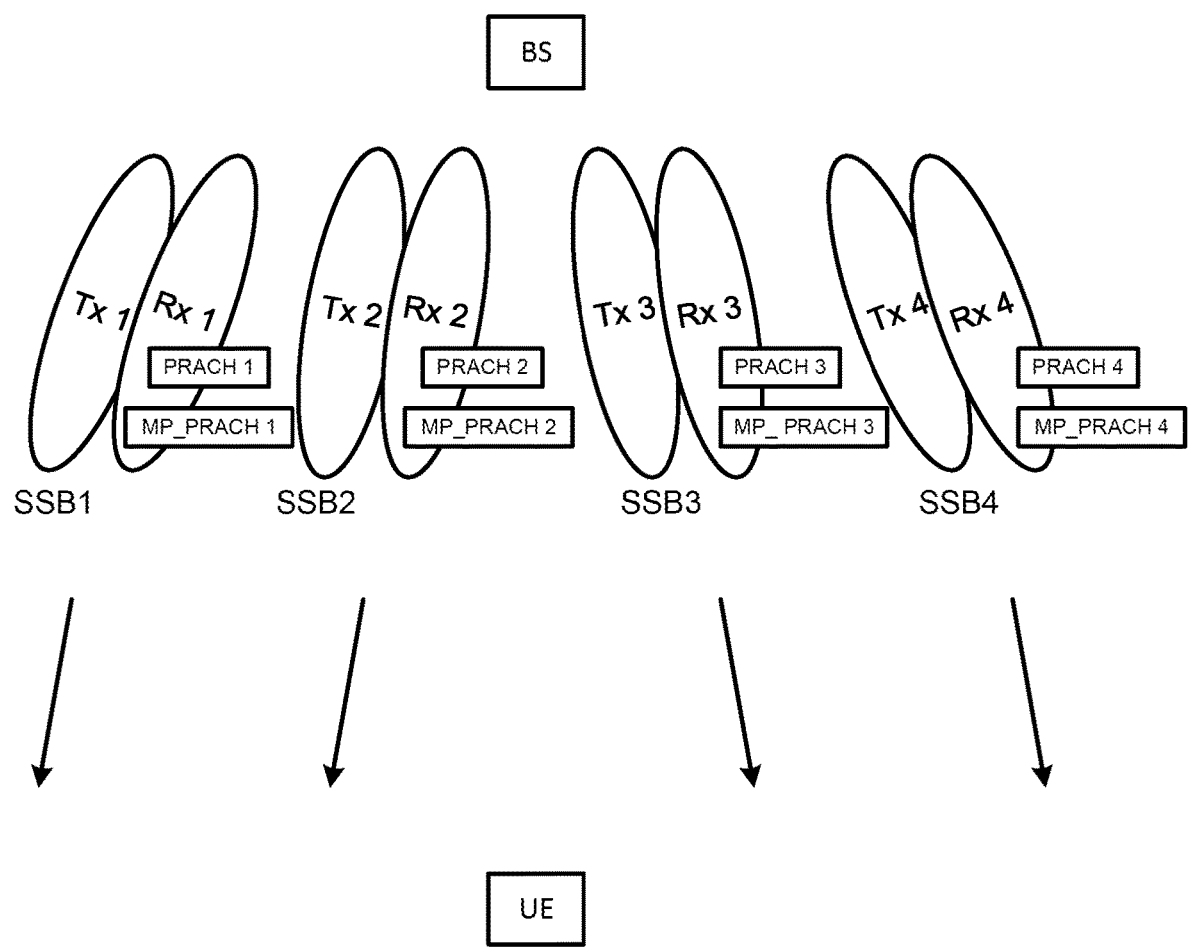
FIG. 4 is a diagram illustrating multiple MP-specific PRACH resources and the associated DL RSs, according to an implementation of the present disclosure.

FIG. 4 is a diagram illustrating multiple MP-specific PRACH resources and the associated DL RSs, according to an implementation of the present disclosure. As described earlier, a PRACH resource configured for MP transmissions (or MP-specific PRACH resource) may be independently configured and/or different from a PRACH resource configured for legacy RA. In the present disclosure, an MP-specific PRACH resource may be configured by an MP-specific PRACH configuration denoted as "MP_PRACH." The terms "MP_PRACH," "MP-specific PRACH configuration," and "PRACH configuration" may be used interchangeably in the present disclosure.

In FIG. 4, in addition to configuring a UE with PRACH resources for legacy RA, the BS (e.g., gNB) may further configure the UE with MP-specific PRACH resources. Therefore, when a UE performs RA with MP transmissions, the UE may use the MP-specific PRACH resource(s) to perform the MP transmissions.

In some implementations, the UE may be configured with multiple PRACH configurations and each of the PRACH configurations is associated with an SSB. As illustrated in FIG. 4, the BS may have multiple DL/Tx beams (e.g., Tx 1, Tx 2, Tx 3, and Tx 4) and multiple UL/Rx beams (e.g., Rx 1, Rx 2, Rx 3, and Rx 4). Each DL beam may be associated with a UL beam and there is a one-to-one mapping relationship between the DL beams and the UL beams. For example, the DL beam Tx 1 may be associated with the UL beam Rx 1, the DL beam Tx 2 may be associated with the UL beam Rx 2, and so on. A series of SSBs (e.g., SSB1, SSB2, SSB3, and SSB4) may be periodically transmitted via the DL beams, respectively. For example, SSB1 may be transmitted via the DL beam Tx 1, SSB2 may be transmitted via the DL beam Tx 2, and so on. Under the multiple-beam architecture, the UE may be configured by the BS with multiple RA configurations, each of which may be associated with one of the SSBs (or DL/Tx beams).

In some implementations, an RA configuration may include at least one PRACH configuration for legacy RA and at least one MP-specific PRACH configuration for MP transmissions. For example, the BS may indicate to the UE a PRACH configuration (e.g., PRACH 1) for legacy RA and an MP-specific PRACH configuration (e.g., MP_PRACH 1) for MP transmissions. PRACH 1 and MP_PRACH 1 are associated with SSB1. The BS may also configure the UE with a PRACH configuration (PRACH 2) for legacy RA and an MP-specific PRACH configuration (e.g., MP_PRACH 2) for MP transmissions, where PRACH 2 and MP_PRACH 2 are associated with SSB2. Similarly, the BS may configure the UE with a PRACH configuration (e.g., PRACH 3) for legacy RA and an MP-specific PRACH configuration (e.g., MP_PRACH 3) for MP transmissions, where PRACH 3 and MP_PRACH 3 are associated with SSB3. The BS may also configure the UE with a PRACH configuration (e.g., PRACH 4) for legacy RA and an MP-specific PRACH configuration (e.g., MP_PRACH 4) for MP transmissions, where PRACH 4 and MP_PRACH 4 are associated with SSB4.

When a UE initiates an RA procedure, the UE may perform a PRACH resource selection procedure to select one of the configured PRACH configurations and MP-specific PRACH configurations to apply. The PRACH resource selection procedure may include the UE determining which MP-specific resource, among the multiple configured MP-specific resources, to use for the initiated RA procedure.

Figure 5:
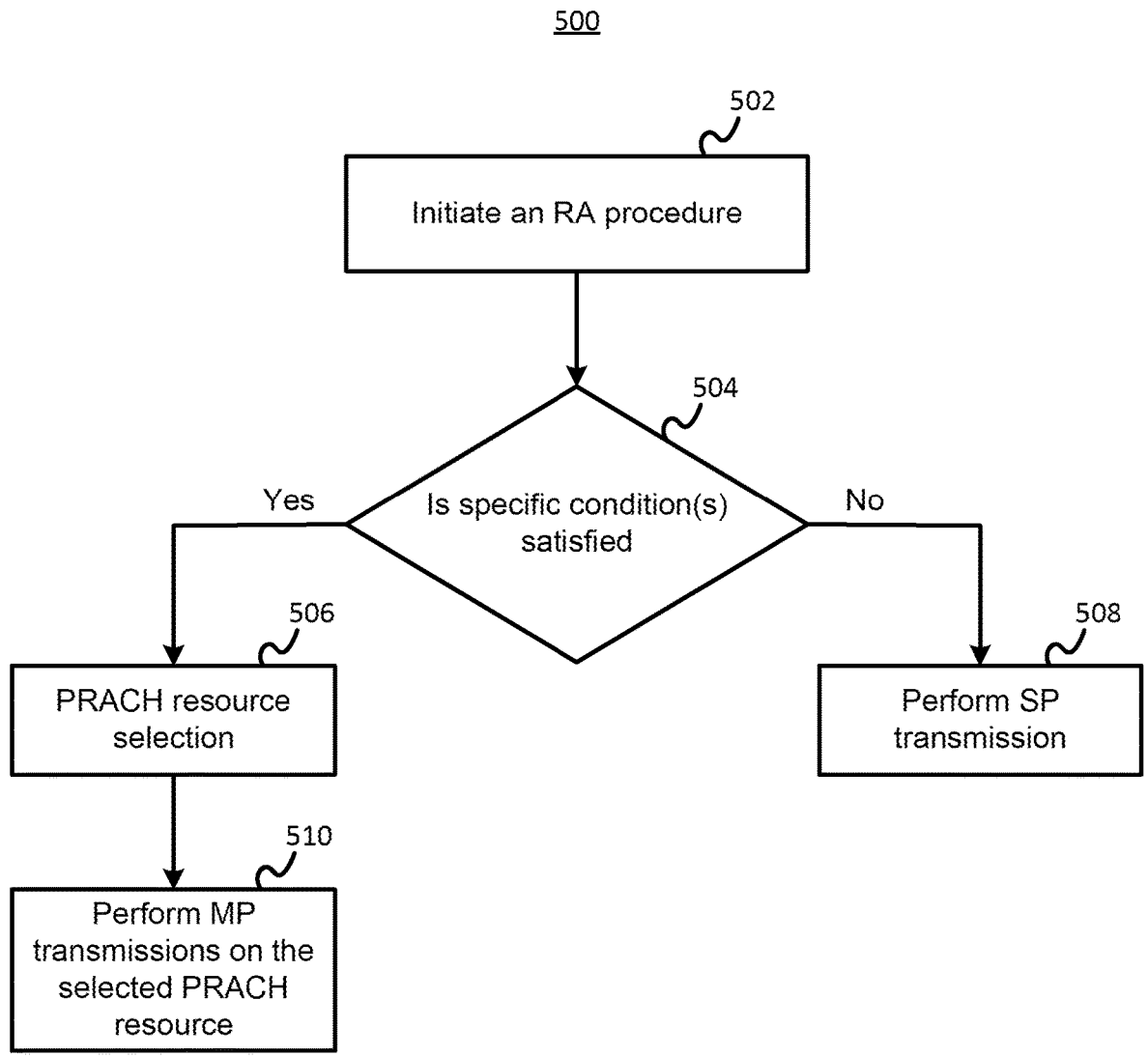
FIG. 5 is a flowchart illustrating a procedure for determining whether an initiated RA procedure uses an SP transmission or MP transmissions, according to an implementation of the present disclosure.

FIG. 5 is a flowchart illustrating a procedure 500 for determining whether an initiated RA procedure uses an SP transmission or MP transmissions, according to an implementation of the present disclosure. In action 502, the UE may initiate an RA procedure. In action 504, the UE may determine whether a specific condition(s) is satisfied. If yes, in action 506, the UE may perform a PRACH resource selection procedure. If no, in action 508, the UE may perform an SP transmission to transmit the RA preamble. In action 510, after the PRACH resource is selected through the PRACH resource selection procedure, the UE may perform MP transmissions on the selected PRACH resource.

In some implementations, the PRACH resource selection procedure may be performed by the UE in response to the UE's decision to perform MP transmissions for the initiated RA procedure. As illustrated in FIG. 5, after the UE initiates an RA procedure for a specific purpose in action 502 (e.g., initial access to transition from an RRC_IDLE state to an RRC_CONNECTED state), the UE may check whether one or more specific conditions are satisfied (action 504). If the one or more specific conditions are satisfied, the UE may perform MP transmissions on a selected PRACH resource for the initiated RA procedure (action 510). The MP transmissions may include the UE performing a PRACH transmission $N_p$ times, where $N_p$ is an integer greater than 1. If the one or more specific conditions are not satisfied, the UE may perform an SP transmission for the initiated RA procedure (action 508). For example, the UE may transmit the RA preamble only once before the UE begins monitoring for the corresponding RAR within a configured time window (e.g., action 102 in FIG. 1). Before performing the MP transmissions for the initiated RA procedure, the UE may perform a PRACH resource selection procedure to select a PRACH resource for the MP transmissions. In some implementations, the value of $N_p$ may be determined/identified/indicated in response to the result of the PRACH resource selection procedure.

Figure 6:
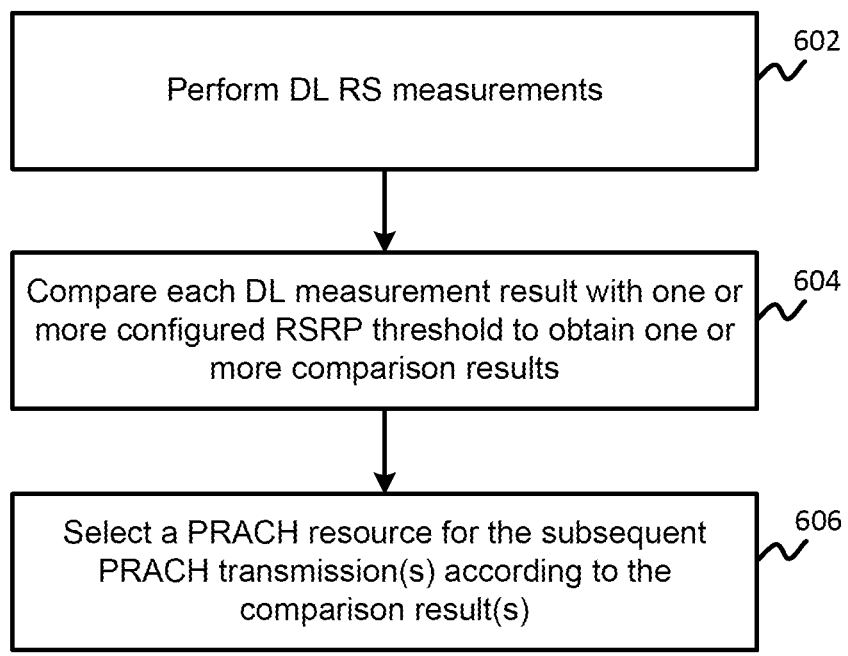
FIG. 6 is a flowchart illustrating a PRACH resource selection procedure according to an implementation of the present disclosure.

FIG. 6 is a flowchart illustrating a PRACH resource selection procedure 600 according to an implementation of the present disclosure. The PRACH resource selection procedure 600 can refer to any PRACH resource selection procedure or MP-specific PRACH resource selection procedure described in the present disclosure.

In action 602, the UE may perform DL RS measurements to measure one or more DL RSs from the BS and obtain one or more corresponding DL RS measurement results. Each DL RS may be an SSB or a CSI-RS. Each DL RS measurement result may include a signal quality/strength level value (e.g., an RSRP value) of the measured DL RS. In action 604, the UE may compare each DL measurement result with one or more configured RSRP thresholds (e.g., configured by the BS) to obtain one or more comparison results. In action 606, the UE may select a PRACH resource (e.g., an MP-specific PRACH resource) for the subsequent PRACH transmission(s) (e.g., MP transmissions) according to the comparison result(s). For example, the UE may select the PRACH resource corresponding to the DL RS with an RSRP value equal to or greater than a configured RSRP threshold for the subsequent PRACH transmission(s) (e.g., MP transmissions). In some implementations, in action 606, the UE may also select an $N_p$ value from a set of configured $N_p$ values to use for MP transmissions according to the comparison result(s). The $N_p$ value may be associated with (or corresponding to) the selected PRACH resource.

The PRACH resource selection procedure may have several alternative ways of implementation with regard to different aspects. For example, the implementation of the PRACH resource selection procedure may depend on how the BS (e.g., gNB) indicates to the UE how many times (e.g., $N_p$) a PRACH transmission should be performed. The value of $N_p$ may be indicated by the BS through an MP_PRACH (which is a (MP-specific) PRACH configuration that configures the PRACH resource(s) for MP transmissions). The MP_PRACH may be transmitted by the BS through an RRC message or other signaling. The MP_PRACH may be associated with an SSB or a DL RS (e.g., a CSI-RS).

In the scheme of MP transmissions, the UE may perform a PRACH transmission a certain number of times (e.g., $N_p$). In some implementations, the UE may determine the value of $N_p$ according to an MP-specific PRACH configuration (e.g., an MP_PRACH) from the BS. In some implementations, each MP-specific PRACH configuration may indicate a value of $N_p$. For example, once the UE decides to perform MP transmissions for an initiated RA procedure, the UE may transmit an MSG1/RA preamble (or other radio signals) on a PRACH resource $N_p$ times, where the value of $N_p$ may be determined by an MP_PRACH that corresponds to the PRACH resource on which the MP transmissions are performed. In some implementations, the value of $N_p$ may be a parameter contained in an MP_PRACH, and the parameter may explicitly indicate the number of times a PRACH transmission should be performed. In some implementations, the UE may determine the value of $N_p$ in an implicit way. For example, the UE may determine the value of $N_p$ according to a PRACH resource pattern indicated by the corresponding MP_PRACH. For example, the UE may determine the value of $N_p$ according to at least one of the following factors: the total number of resources configured by the MP_PRACH, and the length of a PRACH resource (indicated by the MP_PRACH) in the time and/or frequency domain.

MP transmissions can improve reception success on the BS side, but they can also increase power consumption and latency for RA. To reduce these negative effects, the UE may use MP transmissions only when the channel quality/condition is poor/not qualified (e.g., the UE is located at the edge of the cell or the corresponding SINR is quite low). If the channel quality/condition is good or qualified, RA can be successful using SP transmissions without using MP transmissions. On the other hand, if the channel quality/condition is not too poor, RA may still be successful with a limited number of PRACH transmissions.

The present disclosure provides various mechanisms for determining the appropriate number of PRACH transmissions under the EUT scheme.

In some implementations, the UE may be configured (by the BS) with at least two (sets of) MP-specific PRACH configurations (or MP_PRACHs) that are associated with one SSB and/or CSI-RS (DL RS). Each of the MP-specific PRACH configurations may indicate to the UE a value of $N_p$ and the corresponding MP-specific PRACH resource. The UE may determine which of the MP-specific PRACH configurations to apply for an initiated RA procedure during a PRACH resource selection procedure (e.g., in action 506 of FIG. 5). This determination may consider the quality of the radio signal. For example, the UE may perform DL RS measurements and select one of the configured MP-specific PRACH configurations based on the measurement result.

In some implementations, the UE may be configured (by the BS) with MP-specific PRACH configurations on a per-SSB basis or on a per-CSI-RS basis. That is, each MP specific PRACH configuration (or MP_PRACH) may be associated with one SSB and/or one CSI-RS. Each MP-specific PRACH configuration may indicate to the UE a set of $N_p$ values (e.g., at least two $N_p$ values) and a set of MP-specific PRACH resources, where each MP-specific PRACH resource may be associated with/corresponding to a $N_p$ value included in the set of $N_p$ values.

Figure 7:
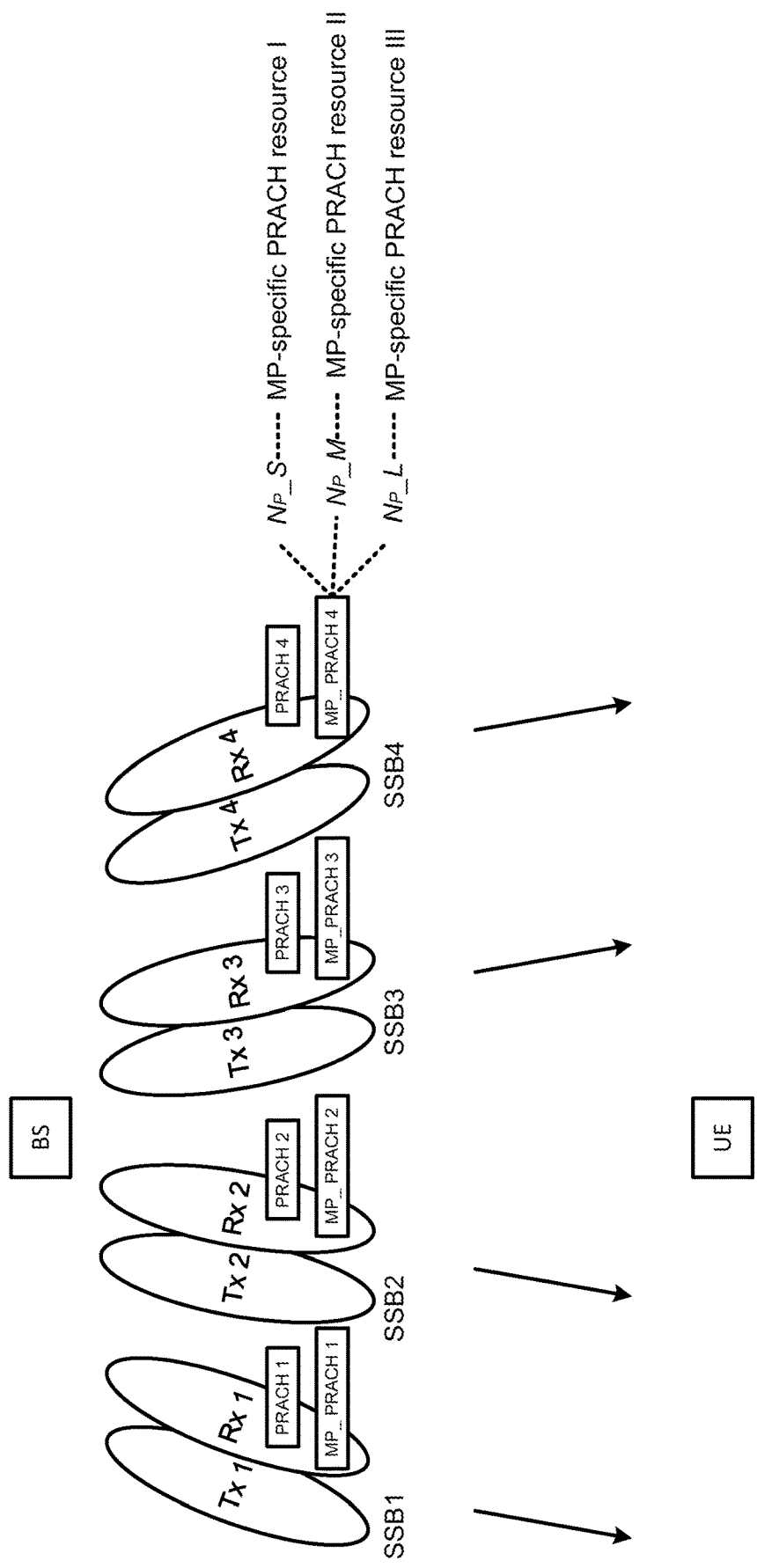
FIG. 7 is a diagram illustrating multiple MP-specific PRACH configurations each associated with an SSB, according to an implementation of the present disclosure.

FIG. 7 is a diagram illustrating multiple MP-specific PRACH configurations each associated with an SSB, according to an implementation of the present disclosure. As illustrated in FIG. 7, the BS may have multiple DL/Tx beams (e.g., Tx 1, Tx 2, Tx 3, and Tx 4) and multiple UL/Rx beams (e.g., Rx 1, Rx 2, Rx 3, and Rx 4). Each DL beam may be associated with a UL beam and there is a one-to-one mapping relationship between the DL beams and the UL beams. For example, the DL beam Tx 1 may be associated with the UL beam Rx 1, the DL beam Tx 2 may be associated with the UL beam Rx 2, and so on. A series of SSBs (e.g., SSB1, SSB2, SSB3, and SSB4) may be transmitted via the DL beams. For example, SSB1 may be transmitted via the DL beam Tx 1, SSB2 may be transmitted via the DL beam Tx 2, and so on. Under the multiple-beam architecture, the UE may be configured by the BS with multiple RA configurations, each of which may be associated with one of the SSBs (or DL/Tx beams).

In some implementations, an RA configuration may include at least one PRACH configuration for legacy RA and at least one MP-specific PRACH configuration for MP transmissions. For example, the BS may indicate to the UE a PRACH configuration (e.g., PRACH 1) for legacy RA and an MP-specific PRACH configuration (e.g., MP_PRACH 1) for MP transmissions. PRACH 1 and MP_PRACH 1 are associated with SSB1. The BS may also configure the UE with a PRACH configuration (e.g., PRACH 2) for legacy RA and an MP-specific PRACH configuration (e.g., MP_PRACH 2) for MP transmissions, where PRACH 2 and MP_PRACH 2 are associated with SSB2. Similarly, the BS may configure the UE with a PRACH configuration (e.g., PRACH 3) for legacy RA and an MP-specific PRACH configuration (e.g., MP_PRACH 3) for MP transmissions, where PRACH 3 and MP_PRACH 3 are associated with SSB3. The BS may also configure the UE with a PRACH configuration (e.g., PRACH 4) for legacy RA and an MP-specific PRACH configuration (e.g., MP_PRACH 4) for MP transmissions, where PRACH 4 and MP_PRACH 4 are associated with SSB4.

In some implementations, at least one of the configured MP-specific PRACH configurations may indicate to the UE a set of MP-specific PRACH resources and a set of corresponding $N_p$ values. As illustrated in FIG. 7, MP_PRACH 4, which is associated with SSB 4, may indicate to the UE three $N_p$ values (e.g., $N_{P\_S}$, $N_{P\_M}$, and $N_{P\_L}$) and three MP-specific PRACH resources (e.g., MP-specific PRACH resource I, MP-specific PRACH resource II, and MP-specific PRACH resource III). In other words, SSB4 is configured with three $N_p$ values and three MP-specific PRACH resources. In some implementations, in addition to SSB 4, one or more of the other SSBs (e.g., SSB 1, SSB 2, and SSB 3) may also be configured with multiple $N_p$ values and multiple corresponding MP-specific PRACH resources.

Each of the $N_p$ values may be associated with/corresponding to one of the MP-specific PRACH resources. In some implementations, the $N_p$ values and the MP-specific PRACH resources in the same MP_PRACH may have a one-to-one mapping relationship between them. For example, the $N_p$ value $N_{P\_S}$ may be associated with the MP-specific PRACH resource I, the $N_p$ value $N_{P\_M}$ may be associated with the MP-specific PRACH resource II, and the $N_p$ value $N_{P\_L}$ may be associated with the MP-specific PRACH resource III.

During the PRACH resource selection procedure, the UE may determine which $N_p$ value and its corresponding MP-specific PRACH resource to use for an initiated RA procedure. For example, the UE may select one of the $N_p$ values and its corresponding MP-specific PRACH resource according to the channel/radio signal quality as the result of the PRACH resource selection procedure.

In some implementations, the UE may be configured with a set of RSRP thresholds which may be used by the UE for the PRACH resource selection procedure.

Figure 8:
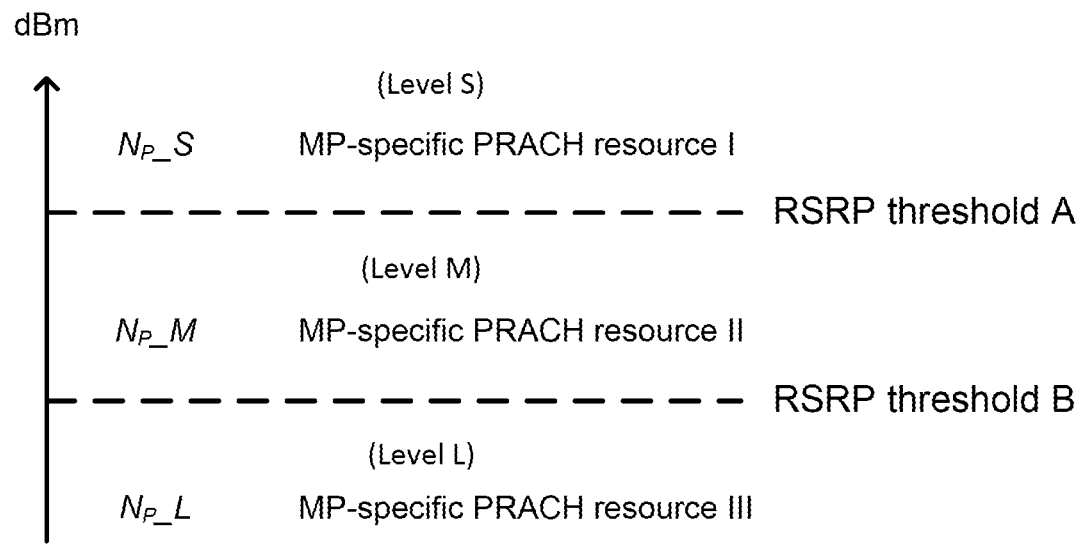
FIG. 8 is a diagram illustrating the use of a set of RSRP thresholds to determine which $N_p$ value and its corresponding MP-specific PRACH resource are selected, according to an implementation of the present disclosure.

FIG. 8 is a diagram illustrating the use of a set of RSRP thresholds to determine which $N_p$ value and its corresponding MP-specific PRACH resource are selected, according to an implementation of the present disclosure. As illustrated in FIG. 8, in addition to being configured with a set of $N_p$ values (e.g., $N_P\_S$, $N_P\_M$, and $N_P\_L$) and a set of MP-specific PRACH resources (e.g., MP-specific PRACH resource I, MP-specific PRACH resource II, and MP-specific PRACH resource III) for at least one of a set of DL RSs from the BS (e.g., SSB4 in FIG. 7), the UE may be further configured with a set of RSRP thresholds (e.g., RSRP threshold A and RSRP threshold B) for the PRACH resource selection procedure. In some implementations, each $N_p$ value may be determined based on the associated RSRP level. For example, in order to reduce the UE's power consumption, an $N_p$ value (e.g., $N_p\_S$) associated with a higher RSRP level (e.g., level S) may be less than an $N_p$ value (e.g., $N_p\_M$) associated with a lower RSRP level (e.g., level M). In some implementations, two or more $N_p$ values in the set of $N_p$ values may have the same value.

During the PRACH resource selection procedure (e.g., the PRACH resource selection procedure 600 in FIG. 6), the UE may perform DL RS measurements and select an $N_p$ value and its corresponding MP-specific PRACH resource for an initiated RA procedure based on the comparison result(s) of the DL measurement result(s) and the configured RSRP threshold(s). For example, if the RSRP value of the DL RS (e.g., SSB4 in FIG. 7) is equal to or less than the RSRP threshold B, the UE may select $N_P\_L$ and MP-specific PRACH resource III for the MP transmissions of the initiated RA procedure. If the RSRP value of the DL RS is equal to or larger than the RSRP threshold A, the UE may select $N_P\_S$ and MP-specific PRACH resource I for the MP transmissions of the initiated RA procedure. If the RSRP value of the DL RS is between the RSRP threshold A and the RSRP threshold B, the UE may select $N_P\_M$ and MP-specific PRACH resource II for the MP transmissions of the initiated RA procedure. In some other implementations, if the RSRP value of the DL RS is between the RSRP threshold A and the RSRP threshold B, the UE may select either the set of "$N_P\_M$ and MP-specific PRACH resource II" or the set of "$N_P\_L$ and MP-specific PRACH resource III" for the MP transmissions of the initiated RA procedure.

In some implementations, the RSRP threshold A and RSRP threshold B may be configured by the BS through dedicated signaling or system information. In some implementations, if the UE does not receive the RSRP threshold A and RSRP threshold B via dedicated signaling, the UE may use the RSRP threshold A and the RSRP threshold B configured by system information. In some implementations, if the UE does not receive the RSRP threshold A and the RSRP threshold B from the BS, the UE may use a preconfigured set of RSRP thresholds as the RSRP threshold A and the RSRP threshold B. In some implementations, in order to provide more flexibility, the BS may configure the set of RSRP thresholds (e.g., RSRP threshold A and RSRP threshold B) on a per-SSB basis or on a per-DL-RS basis. For example, the BS may indicate to the UE a first set of RSRP thresholds for SSB1 and a second set of RSRP thresholds for SSB2. The first set of RSRP thresholds and the second set of RSRP thresholds may be independently configured. In some implementation, all SSBs/DL RSs may share the same set of RSRP thresholds for the PRACH resource selection procedure.

Although the set of RSRP thresholds depicted in FIG. 8 includes RSRP threshold A and RSRP threshold B, the present disclosure is not limited thereto. That is, a set of RSRP thresholds configured by the BS may include one or more RSRP thresholds. Based on the comparison result of the measurement result(s) of the DL RS(s) and the one or more RSRP thresholds, the UE may determine which $N_p$ value and its corresponding MP-specific PRACH resource to use.

In some implementations, the BS may explicitly indicate to the UE which $N_P$ value and its corresponding MP-specific PRACH resource to use for an initiated RA procedure. In some other implementations, the UE may determine which $N_P$ value and its corresponding MP-specific PRACH resource to use for an initiated RA procedure according to the purpose of initiating the RA procedure (e.g., for beam failure recovery, for system information request, and/or for uplink resource request (scheduling request)). For example, if the RA procedure is initiated for beam failure recovery, the UE may apply a particular $N_P\_$value and its corresponding MP-specific PRACH resource (e.g., $N_P\_L$ and MP-specific PRACH resource III in FIG. 8) for the initiated RA procedure for beam failure recovery.

As described earlier, a UE may determine which $N_P\_$value and MP-specific PRACH resource to use for an initiated RA procedure. The present disclosure also includes a PRACH resource switching mechanism which allows the UE to have the flexibility to use different sets of an $N_p$ value and its corresponding MP-specific PRACH resource for an ongoing RA procedure, as radio conditions can change dynamically.

For example, if the PRACH transmission from the UE cannot be received by the BS, causing the UE to fail to receive an RAR corresponding to the PRACH transmission within a configured time window several times, the UE may apply a different set of an $N_P\_$value and its corresponding MP-specific PRACH resource for the subsequent PRACH transmission(s) during the ongoing RA procedure.

Figure 9:
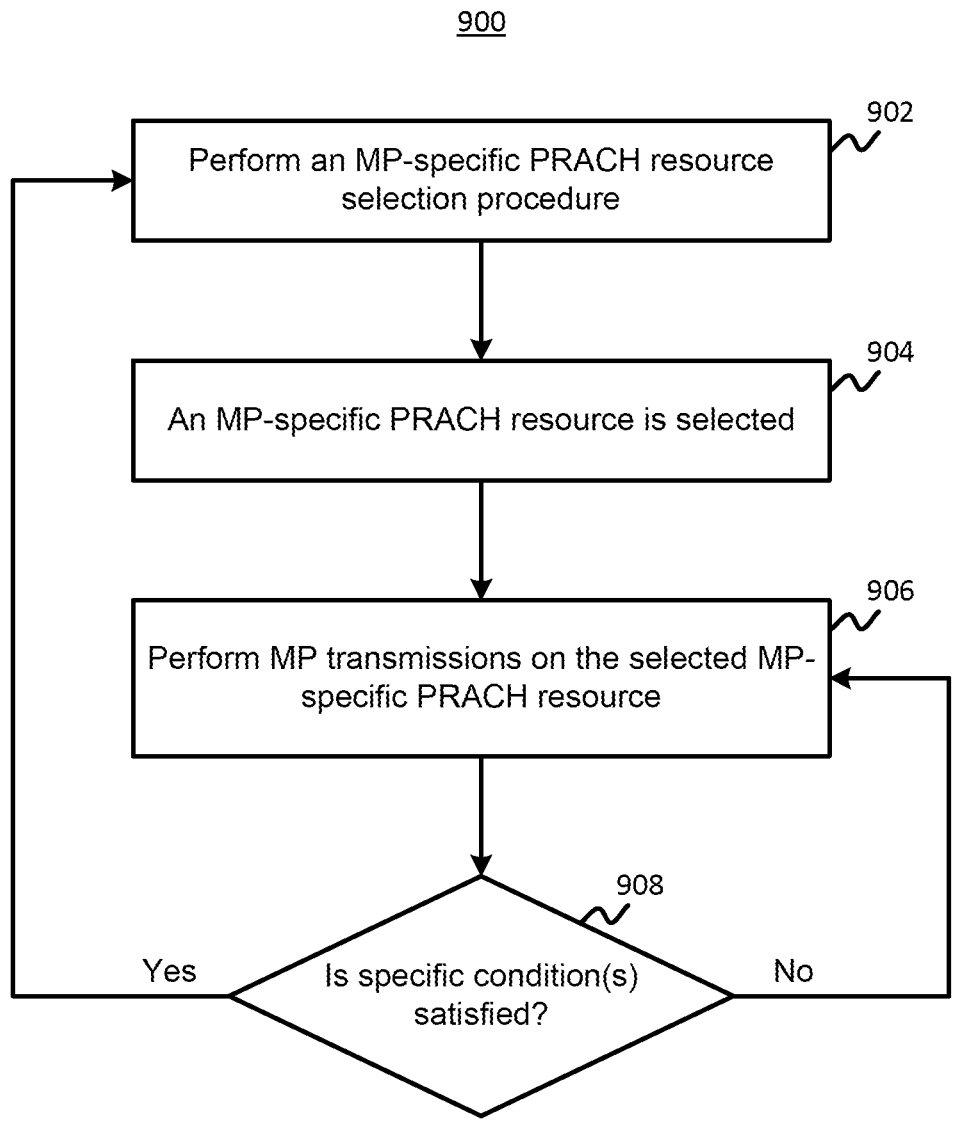
FIG. 9 is a flowchart illustrating a PRACH resource switching procedure according to an implementation of the present disclosure.

FIG. 9 is a flowchart illustrating a PRACH resource switching procedure 900 according to an implementation of the present disclosure. The PRACH resource switching procedure 900 can be combined with other procedures/methods described in the present disclosure to introduce a PRACH resource switching function that allows the UE to adapt to dynamically changing channel conditions.

As illustrated in FIG. 9, in action 902, the UE may perform an MP-specific PRACH resource selection procedure. The MP-specific PRACH resource selection procedure may be performed before the UE performs MP transmissions for an initiated RA procedure. The UE may be configured with multiple MP-specific PRACH configurations, each indicating a set of $N_p$ values and a set of MP-specific PRACH resources. The UE may select an MP-specific PRACH resource (and the corresponding $N_p$ value) based on DL RS measurements.

In action 904, once an MP-specific PRACH resource is selected by the UE, then in action 906, the UE may perform MP transmissions on the selected MP-specific PRACH resource (e.g., performing a PRACH transmission on the selected MP-specific PRACH resource $N_p$ times). In action 908, in response to performing the MP transmissions on the selected MP-specific PRACH resource, the UE may further determine whether one or more specific conditions are satisfied. If the outcome of action 908 is yes, the UE may fall back to action 902 to reselect an MP-specific PRACH resource (and an $N_p$ value) to use. In some implementations, the fallback from action 908 to action 902 may be performed after a random backoff and before the UE performs PRACH retransmission(s).

If the outcome of action 908 is no, the UE may fall back to action 906 to perform PRACH retransmission(s) after a corresponding random backoff. In other words, if the UE does not receive an RAR corresponding to the PRACH transmission, the UE may fall back to action 906 from action 908. In some implementations, the fallback from action 908 to action 906 may include the UE performing MP transmissions on the same MP-specific PRACH resource as the one used in the previous round of MP transmissions before a random backoff.

In some implementations, the UE may be configured with multiple sets of MP-specific PRACH resources that are associated with different RSRP levels (e.g., level S, level M, and level L in FIG. 8), but may only be configured with a single $N_p$ value. In other words, regardless of which MP-specific PRACH resource the UE uses for an initiated RA procedure, the UE will always use the same $N_p$ value.

In some implementations, if the UE falls back from action 908 to action 902 of FIG. 9, the MP-specific PRACH resource selection procedure in action 902 may include the UE selecting another MP-specific PRACH resource that is configured by the BS and associated with a lower RSRP level. For example, if the UE first selects $N_P\_S$ and MP-specific PRACH resource I (which are associated with level S in FIG. 8) for MP transmissions in action 904 of FIG. 9, the UE may then perform MP transmissions on the selected MP-specific PRACH resource I for $N_p\_S$ times. Afterwards, if a specific condition is satisfied in action 908, the UE may fall back to action 902 to reselect an MP-specific PRACH resource without considering the RSRP value of the corresponding DL RS. In other words, after a random backoff, the UE may perform the MP-specific PRACH resource selection procedure to reselect an MP-specific PRACH resource for subsequent MP (re)transmissions without performing DL RS measurements and/or without considering the configured RSRP threshold(s) (e.g., the RSRP threshold A and RSRP threshold B in FIG. 8). The UE may directly select an $N_p$ value and its corresponding MP-specific PRACH resource that are associated with the next lower RSRP level for the subsequent MP (re)transmissions (e.g., $N_{P\_}M$ and MP-specific PRACH resource II, which are associated with a lower RSRP level, level M, than the previous one, level S, in FIG. 8). If $N_{P\_}M$ and MP-specific PRACH resource II are selected in the new round, the UE may perform the MP (re)transmissions on the selected MP-specific PRACH resource II for $N_{p\_}M$ times.

Figure 10:
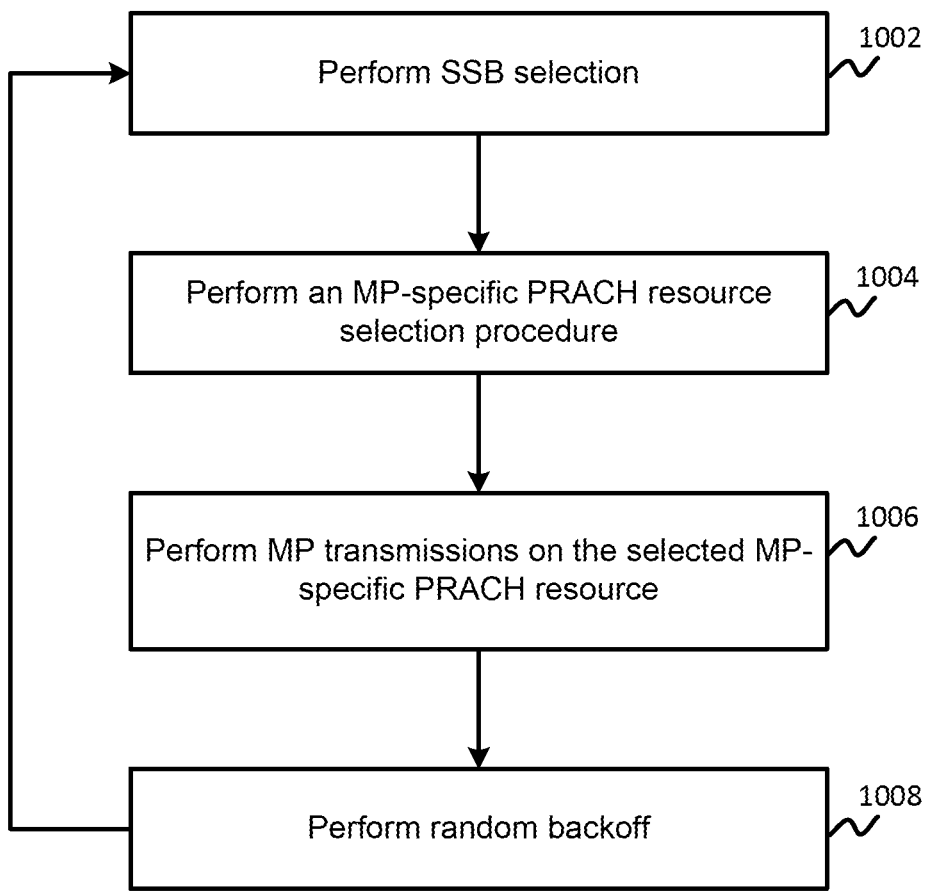
FIG. 10 is a flowchart illustrating an MP-specific PRACH resource selection procedure and other related actions having a specific execution order, according to an implementation of the present disclosure.

FIG. 10 is a flowchart illustrating an MP-specific PRACH resource selection procedure and other related actions having a specific execution order, according to an implementation of the present disclosure. The implementation of FIG. 10 can be combined with other procedures/methods that involve an MP-specific PRACH resource selection procedure described in the present disclosure.

As illustrated in FIG. 10, after performing SSB selection in action 1002, the UE may perform an MP-specific PRACH resource selection procedure in action 1004. For example, the UE may first perform SSB measurements on each SSB and compare each of the measurement results of the SSB(s) with a configured RSRP threshold (e.g., rsrp-Threshold-SSB). In the SSB selection, the UE may select the SSB(s) with an RSRP value greater than or equal to the configured RSRP threshold for the subsequent PRACH transmission(s). Then, the UE may select one of the configured MP-specific PRACH resources associated with the selected SSB during the MP-specific PRACH resource selection procedure by using one or more configured RSRP thresholds (e.g., RSRP threshold A and RSRP threshold B in FIG. 8). The MP-specific PRACH resource selection procedure in action 1004 can refer to any (MP-specific) PRACH resource selection procedure described in the present disclosure.

The UE may then perform MP transmissions on the selected MP-specific PRACH resource in action 1006. If the MP transmissions are not successful (e.g., the UE does not receive a corresponding RAR from the BS within a configured time window), the UE may perform a random backoff in action 1008 and repeat the flow in the next round, e.g., starting by reselecting an SSB in action 1002, followed by reselecting an MP-specific PRACH resource in action 1004, and then performing MP transmissions on the reselected MP-specific PRACH resource in action 1006. If the MP transmissions are successful (e.g., the UE successfully receives the corresponding RAR from the BS), the flow ends. If the MP transmissions are still not successful, the UE may perform the random backoff in action 1008 again and repeat the flow in the following round, and so on, until the MP transmissions are successful or certain end condition(s) of the flow is satisfied.

In FIG. 10, the UE may perform the MP-specific PRACH resource selection procedure after the SSB selection in each round of the flow (e.g., from action 1002 to 1008). In some implementations, after a random backoff, the UE may apply a different MP-specific PRACH resource in the PRACH transmission stage (e.g., action 1006) of the new round of the flow. In some implementations, the set of RSRP thresholds (e.g., RSRP threshold A and RSRP threshold B) configured for the UE to select the MP-specific PRACH resource may be configured by the BS on a per-SSB basis. The UE may apply the set of RSRP thresholds that is associated with the SSB determined from the SSB selection to perform the MP-specific PRACH resource selection procedure.

In some implementations, during the SSB selection in action 1002, the UE may perform SSB measurements on each SSB and compare the measurement results of the SSB(s) with a configured RSRP threshold. The UE may also select the SSB(s) with an RSRP value greater than or equal to the configured threshold (e.g., rsrp-ThresholdSSB) for the subsequent PRACH transmission(s). If the RSRP values of all SSBs are below the configured threshold, in action 1004, the UE may still select an MP-specific PRACH resource to use for the subsequent PRACH/MP transmissions. The selected MP-specific PRACH resource may be associated with a lower or the lowest RSRP level, e.g., the MP-specific PRACH resource III associated with level L in FIG. 8. In comparison, the MP-specific PRACH resource II in FIG. 8 is associated with a medium RSRP level, level M; the MP-specific PRACH resource I in FIG. 8 is associated with a higher RSRP level, level S.

Figure 11:
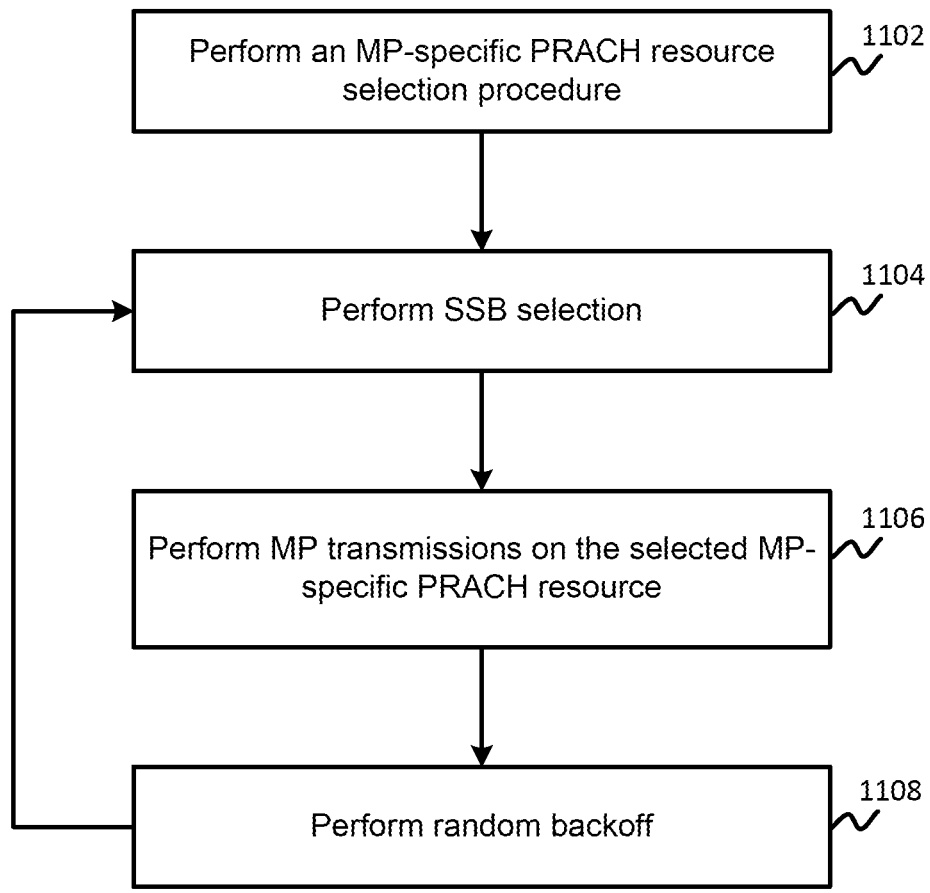
FIG. 11 is a flowchart illustrating an MP-specific PRACH resource selection procedure and other related actions having a specific execution order, according to an implementation of the present disclosure.

FIG. 11 is a flowchart illustrating an MP-specific PRACH resource selection procedure and other related actions having a specific execution order, according to an implementation of the present disclosure. The implementation of FIG. 11 can be combined with other procedures/methods that involve an MP-specific PRACH resource selection procedure described in the present disclosure.

As illustrated in FIG. 11, the MP-specific PRACH resource selection procedure (action 1102) may be performed before SSB selection (action 1104). That is, the UE may perform the MP-specific PRACH resource selection procedure and then the SSB selection. During the MP-specific PRACH resource selection procedure, the UE may perform DL RS measurements and compare the RSRP value of each DL RS with a set of configured RSRP thresholds, where the set of configured RSRP thresholds may include one or more configured RSRP thresholds (e.g., the RSRP threshold A and RSRP threshold B in FIG. 8). The UE may keep/store the comparison result(s) obtained from the MP-specific PRACH resource selection procedure so as to use them for selecting an MP-specific PRACH resource after the SSB selection is performed.

In some implementations, the set of RSRP thresholds (e.g., the RSRP threshold A and the RSRP threshold B) configured by the BS may be shared among all SSBs. That is, the UE may be configured with only one set of RSRP thresholds for all SSBs. Once the UE finishes the random backoff (action 1108), the UE may not need to perform the MP-specific PRACH resource selection procedure in action 1102 again. The UE may directly fall back from action 1108 to action 1104 to perform the SSB selection in the next round of the flow after the random backoff. Once the SSB is selected, the MP-specific PRACH resource can then be determined according to the selected SSB and the RSRP level determined in action 1102. The UE may use the newly determined MP-specific PRACH resource associated with the selected SSB to perform MP transmissions (action 1106), where the MP-specific PRACH resource may be associated with the same RSRP level determined in action 1102.

For example, as shown in Table 1, there are four SSBs configured by the BS (e.g., SSB1, SSB2, SSB3, and SSB4) for the UE. The UE is also configured with three sets of $N_P$ values and MP-specific PRACH resources for each SSB: [$N_P\_S$, MP-specific resource I], [$N_P\_M$, MP-specific resource II], and [$N_P\_L$, MP-specific resource III]. In some implementations, the selection of an $N_p$ value and its corresponding MP-specific PRACH resource among these three sets may follow the implementations outlined in FIG. 8 (e.g., according to a comparison of the RSRP value of the DL RS and a set of configured RSRP thresholds including the RSRP threshold A and the RSRP threshold B). In some implementations, the selection among these three sets for each SSB may apply the same set of configured RSRP thresholds (e.g., the same RSRP threshold A and the same RSRP threshold B). In such a case, the $N_P\_S$ and the MP-specific PRACH resource I for all SSBs may belong to a higher RSRP level (denoted as level S), the $N_P\_M$ and MP-specific PRACH resource II for all SSBs may belong to a medium RSRP level (denoted as level M), and the $N_P\_L$ and MP-specific PRACH resource III for all SSBs may belong to a lower RSRP level (denoted as level L).

backoff in action 1108, the UE may not need to perform DL RS measurements again, and the UE may not need to compare the corresponding RSRP value of the DL RS with the configured RSRP threshold A and RSRP threshold B. The UE can perform the SSB selection directly in the next round of the flow after the random backoff. Once the SSB is selected, the UE may use the MP-specific PRACH resource associated with the selected SSB and associated with Level S to perform MP transmissions.

Referring to FIG. 11, the MP-specific PRACH resource selection procedure in action 1102 is performed before SSB selection in action 1104. That is, the UE may perform the MP-specific PRACH resource selection first and then the SSB selection. In some implementations, the MP-specific PRACH resource selection procedure may include the UE performing DL RS measurements, comparing the RSRP value of each measured DL RS with a set of configured RSRP values (e.g., the RSRP threshold A and the RSRP threshold B), and keeping/storing/retaining the comparison result(s) for later use (e.g., selecting an MP-specific PRACH resource), even after the SSB selection is completed.

During the SSB selection in action 1104, the UE may select an SSB by comparing the RSRP value of each SSB with a configured set of RSRP thresholds (e.g., the RSRP threshold A and the RSRP threshold B). In some implementations, the UE may only select an SSB with an RSRP value that is equal to or greater than an RSRP threshold in the configured set of RSRP thresholds.

In some implementations, the use of the RSRP threshold A or the RSRP threshold B may be determined based on which RSRP level is selected/applied. For example, if the UE selects level S (e.g., in the MP-specific PRACH resource selection procedure in action 1102) because the DL RS has an RSRP equal to or greater than the RSRP threshold A, then only the SSB with an RSRP value equal to or greater than the RSRP threshold A can be selected; if the UE selects level M (e.g., in the MP-specific PRACH resource selection procedure in action 1102) because the DL RS has an RSRP equal to or greater than the RSRP threshold B, then only the SSB with an RSRP value equal to or greater than the RSRP threshold B can be selected; if the UE selects level L (e.g., in the MP-specific PRACH resource selection procedure in

TABLE 1

| SSB 1 | SSB 2 | SSB 3 | SSB 4 | |
|---|---|---|---|---|
| $N_P\_S$ MP-specific PRACH resource I | $N_P\_S$ MP-specific PRACH resource I | $N_P\_S$ MP-specific PRACH resource I | $N_P\_S$ MP-specific PRACH resource I | Level S |
| $N_P\_M$ MP-specific PRACH resource II | $N_P\_M$ MP-specific PRACH resource II | $N_P\_M$ MP-specific PRACH resource II | $N_P\_M$ MP-specific PRACH resource II | Level M |
| $N_P\_L$ MP-specific PRACH resource III | $N_P\_L$ MP-specific PRACH resource III | $N_P\_L$ MP-specific PRACH resource III | $N_P\_L$ MP-specific PRACH resource III | Level L |

In some implementations, the UE may perform DL RS measurements and determine/select an RSRP level (e.g., Level S, M, or L in Table 1) in action 1102. Then in action 1104, the UE may select an SSB for the initiated RA procedure. The UE may apply the MP-specific PRACH resource associated with the RSRP level determined/selected in action 1102. For example, if the UE selects Level S in action 1102 and selects SSB2 in action 1104, the UE may apply the set of the $N_P\_S$ and the MP-specific PRACH resource I associated with SSB2 for MP transmissions according to Table 1. Once the UE finishes the random action 1102) because the DL RS has an RSRP less than the RSRP threshold B, then any SSB provided by the BS can be selected. The RSRP threshold A and the RSRP threshold B configured by the BS may be shared by all SSBs. That is, the UE may be configured with only one set of configured RSRP thresholds, such as the RSRP threshold A and RSRP threshold B, for all SSBs. Once the UE finishes the random backoff (e.g., action 1108), the UE may not need to perform the MP-specific PRACH resource selection procedure in action 1102 again. The UE may directly fall back to action 1104 from action 1108 to perform SSB (re)selection. Once an SSB is selected, the MP-specific PRACH resource can then be determined according to the selected SSB and the RSRP level determined in action 1102 in the previous round of the flow. That is, the reselected MP-specific PRACH resource may be associated with the same RSRP level (e.g., level S, M, or L) as that determined in action 1102.

The RSRP levels, such as levels S, M, and L, mentioned in this disclosure are for illustrative purposes only and are not intended to limit the invention. The number of RSRP levels can be arbitrary, depending on, for example, the configuration or implementation of the network. Additionally, each level can be associated with one or more MP-specific PRACH resources. For example, the BS may configure one or more (MP-specific) PRACH resources to belong to the same RSRP level. In some implementations, the RSRP level(s) configured by the BS for the UE may depend on, or may be modified based on, different radio conditions.

In some implementations, the UE may determine whether to select an MP-specific PRACH resource associated with a different RSRP level based on the number of rounds the UE has performed the MP transmissions and/or whether each round of the MP transmissions applied an MP-specific PRACH resource associated with the same SSB. For example, the UE may be configured by the BS with a counter (or MP_Counter) and a threshold for the counter (or counter threshold). The UE may use the counter to determine whether to switch or change the selected MP-specific PRACH resource to use according to the value of the counter and the counter threshold.

Figure 12:
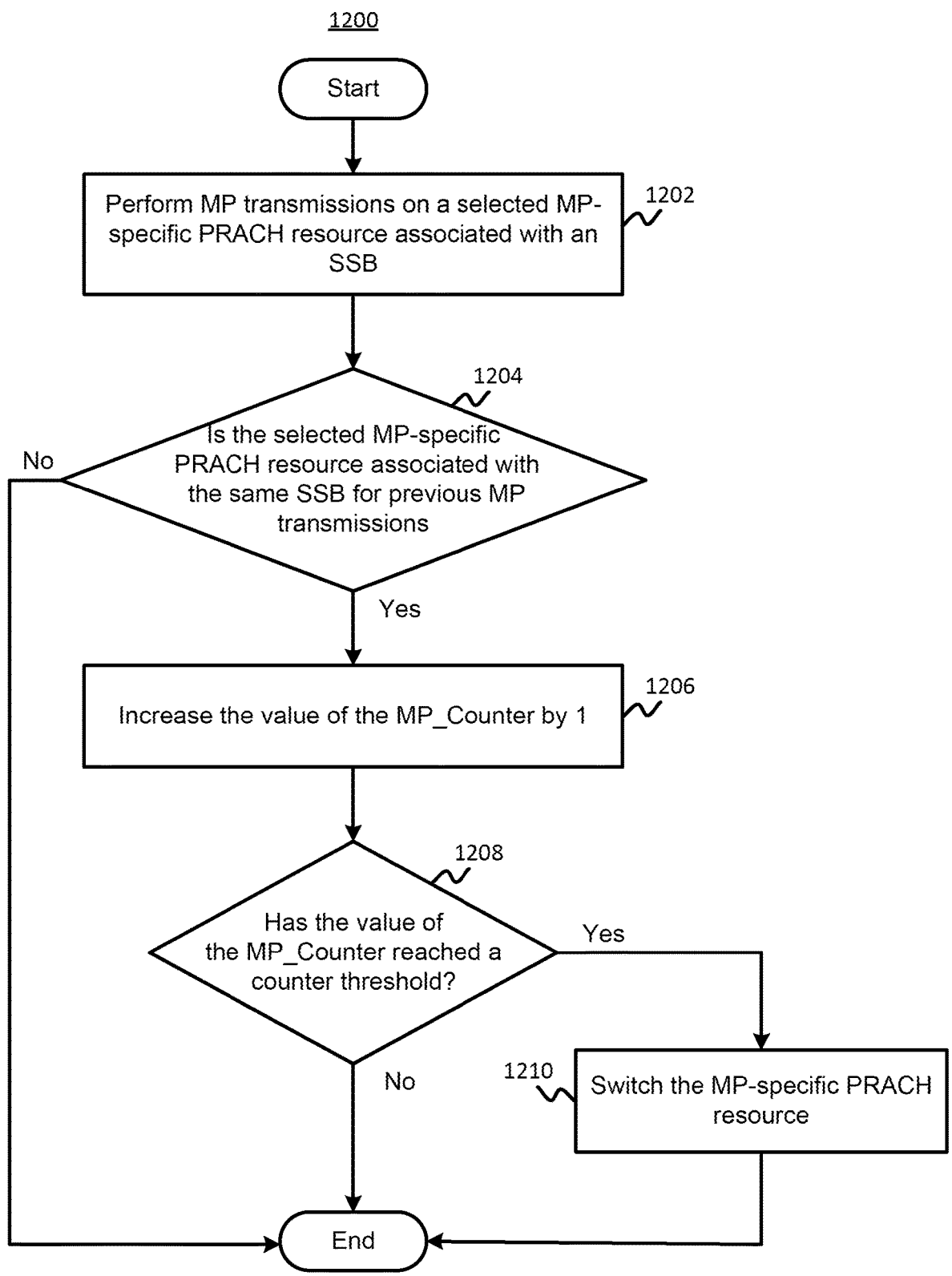
FIG. 12 is a flowchart illustrating a procedure for determining whether to switch an MP-specific PRACH resource, according to an implementation of the present disclosure.

FIG. 12 is a flowchart illustrating a procedure 1200 for determining whether to switch an MP-specific PRACH resource, according to an implementation of the present disclosure. The procedure 1200 can be combined with other methods/procedures described in the present disclosure to introduce the mechanism of switching or changing a selected MP-specific PRACH resource to use.

As illustrated in FIG. 12, after the UE performs MP transmissions on an MP-specific PRACH resource associated with an SSB in action 1202, the UE, in action 1204, may determine whether the SSB is the same as the SSB associated with the MP-specific PRACH resource applied by the UE for MP transmissions in the previous round of MP transmissions. As mentioned earlier, there may be a random backoff between two rounds of MP transmissions. That is, a new round of MP transmissions may be started after a random backoff.

If the outcome of action 1204 is yes, in action 1206, the UE may increase the value of the MP_Counter by 1 (Step 3). If the outcome of action 1204 is no, the value of the MP_Counter remains unchanged. The UE may then compare the value of the MP_Counter with the counter threshold and determine whether the value of the MP_Counter has reached the counter threshold (action 1208). If the outcome of action 1208 is yes, in action 1210, the UE may switch or change the MP-specific PRACH resource. For example, the UE may perform an MP-specific PRACH resource switching procedure which includes the UE selecting an MP-specific PRACH resource associated with a different RSRP level (e.g., a lower RSRP level than the present one). In some implementations, action 1208 may correspond to action 908 of FIG. 9. That is, the specific condition(s) described in action 908 of FIG. 9 may include the UE determining that the value of the MP_Counter has reached the counter threshold.

From a perspective of the UE's MAC entity, once the UE initiates an RA procedure, the MAC entity of the UE may apply a set of PRACH configurations and a corresponding RA configuration. These configurations may be configured by the RRC layer (e.g., through RRC signaling from the BS) while the UE is initiating/performing the RA procedure. If the UE switches the MP-specific PRACH resource (e.g., from MP-specific PRACH resource I associated with level S to MP-specific PRACH resource II associated with level M, or to MP-specific PRACH resource III associated with level L), the UE may suspend the use of the MP-specific PRACH resource I or discard the MP-specific PRACH resource I.

In some implementations, the MP_Counter may be reset by the UE when the UE receives an RRC configuration that reconfigures the counter threshold for the MP_Counter.

In some implementations, the MP_Counter may be reset by the UE when the UE receives an RRC configuration which reconfigures an MP-specific PRACH resource applied by the UE for the ongoing RA procedure.

In some implementations, the MP_Counter may be reset by the UE when the UE receives an RRC configuration which reconfigures the MP-specific PRACH resource applied by the UE for the ongoing RA procedure.

In some implementations, the MP_Counter may be reset by the UE when the UE receives an RRC configuration which reconfigures the $N_p$ value of the SSB applied by the UE for the ongoing RA procedure.

In some implementations, the UE may be indicated by the BS via the RAR to perform the MP-specific PRACH resource switching procedure. For example, a UE may first use an MP-specific PRACH resource associated with level S to perform MP transmissions. Then the UE may receive an RAR that indicates the UE to apply an MP-specific PRACH resource that is associated with a different RSRP level (e.g., level M or level L) that may be explicitly indicated by the BS or implicitly determined by the UE. For example, the UE may select an MP-specific PRACH resource associated with a next lower RSRP level without being indicated by the BS which RSRP level to use.

In NR, an RA procedure initiated by a UE may be triggered in response to the UE receiving a PDCCH order (e.g., signaling of the PHY layer from the BS, such as DCI). The BS may indicate to the UE a specific RSRP level (e.g., level S, M, or L) and/or an $N_p$ value together with the PDCCH order. In some implementations, the UE may know which $N_p$ value to use according to the indicated RSRP level from the BS. For example, if level S is indicated, then the UE may know that the $N_p$ value $N_p\_S$ and the corresponding MP-specific PRACH resource I are to be used for MP transmissions.

In an RA procedure, the UE may ramp up its transmission power for the PRACH retransmission(s) after a random backoff. For example, the UE may transmit a first RA preamble with a first transmission power, but not receive an RAR corresponding to the first preamble within a configured time window. Afterwards, the UE may perform a random backoff and then transmit a second RA preamble (or a PRACH retransmission) with a second transmission power, where the second transmission power may be higher than the first transmission power.

In some implementations, if the EUT scheme is applied, the UE may apply the maximal transmission power for an MP-specific PRACH resource associated with the last/lowest RSRP level (e.g., level L in FIG. 8). For example, the UE may step-by-step increase its transmission power for each round of MP transmissions if the selected MP-specific PRACH resource is not associated with the last/lowest RSRP level (e.g., the selected MP-specific PRACH resource is associated with level S or M in FIG. 8), but the UE may apply the maximum transmission power once the UE switches to use the MP-specific PRACH resource associated with the last/lowest RSRP level (e.g., level L).

In some implementations, the UE may use the maximum transmission power for MP transmissions if the MP-specific PRACH resource for the MP transmissions belongs to a specific set of RSRP levels. For example, if the MP-specific PRACH resource is associated with a specific RSRP level or an RSRP level greater than the specific RSRP level, the UE may use the maximum transmission power to transmit the MP-specific PRACH resource. The specific RSRP level may be configured by the BS through an MP-specific PRACH configuration.

In some implementations, the UE may be configured with a power-ramping factor (powerRampingStep) for an RA procedure with MP transmissions. Once the UE initiates an RA procedure with MP transmissions, the UE may apply the power-ramping factor to determine the transmission power. In some implementations, the UE may be configured with multiple power-ramping factors, and each power-ramping factor is associated with a specific RSRP level (e.g., level S, M, or L). Once the RA procedure with MP transmissions applies an MP-specific PRACH resource associated with the specific RSRP level, the UE may then apply the associated power-ramping factor. In some implementations, the power-ramping factor may be defined by referring to the RA procedure defined in 3GPP TS 38.321 v16.7.0.

Figure 13:
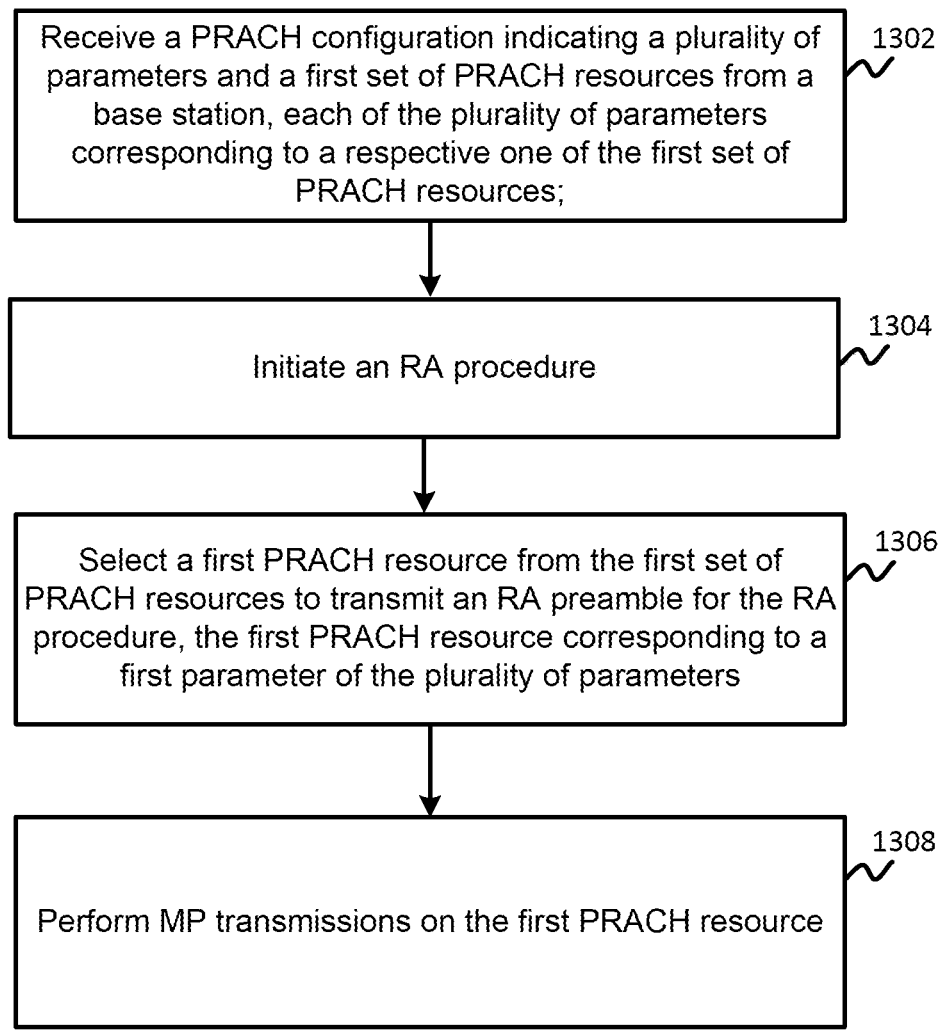
FIG. 13 is a flowchart of a method for performing uplink transmissions, according to an example implementation of the present disclosure.

FIG. 13 is a flowchart of a method 1300 for performing uplink transmissions, according to an example implementation of the present disclosure. Although actions 1302, 1304, 1306 and 1308 are illustrated as separate actions represented as independent blocks in FIG. 13, these separately illustrated actions should not be construed as necessarily order-dependent. The order in which the actions are performed in FIG. 13 is not intended to be construed as a limitation, and any number of the disclosed blocks may be combined in any order to implement the method, or an alternate method. Each of actions 1302, 1304, 1306 and 1308 may be performed independently of other actions and can be omitted in some implementations of the present disclosure. Moreover, the method 1300 can be combined with other procedures/methods described in the present disclosure.

In action 1302, a UE may receive a PRACH configuration indicating a plurality of parameters and a first set of PRACH resources from a base station. Each of the plurality of parameters may correspond to a respective one of the first set of PRACH resources.

The plurality of parameters in the PRACH configuration may be $N_p$ values or any other indicator that the UE uses to determine the number of times an RA preamble should be transmitted in the MP transmissions. Taking FIG. 7 as an example, the UE receives a PRACH configuration (e.g., MP_PRACH 4) that indicates a plurality of parameters (e.g., $N_{P\_}S$, $N_{P\_}M$, and $N_{P\_}L$) and a first set of PRACH resources (e.g., MP-specific PRACH resource I, MP-specific PRACH resource II, and MP-specific PRACH resource III), where $N_{P\_}S$ corresponds to MP-specific PRACH resource I, $N_{P\_}M$ corresponds to MP-specific PRACH resource II, and $N_{P\_}L$ corresponds to MP-specific PRACH resource III.

It should be noted that although action 1302 (and/or other actions in FIG. 13) may be described with reference to FIG. 7, it does not mean that action 1302 (and/or other actions in FIG. 13) is intended to be restricted to the implementation/embodiment illustrated in FIG. 7. As described earlier, any action in method 1300 can correspond to or be combined with other procedures or methods related to MP transmissions that are described in the present disclosure.

In action 1304, the UE may initiate an RA procedure.

In action 1306, the UE may select a first PRACH resource from the first set of PRACH resources to transmit an RA preamble for the RA procedure. The first PRACH resource may correspond to a first parameter of the plurality of parameters.

In action 1308, the UE may perform MP transmissions on the first PRACH resource. The MP transmissions may include (the UE) transmitting the RA preamble a first number of times before the UE begins monitoring for an RAR that corresponds to the RA preamble. The first number of times may be determined by the first parameter. The first set of PRACH resources may be configured for the MP transmissions.

For example, according to FIG. 7, if the UE selects MP-specific PRACH resource II that corresponds to $N_{P\_}M$ to transmit the RA preamble, the UE performs MP transmissions on the MP-specific PRACH resource II. That is, the UE may transmit the RA preamble $N_{P\_}M$ times before the UE begins monitoring for an RAR that corresponds to the RA preamble. As illustrated in FIG. 3, the UE may transmit the RA preamble a certain number of times (e.g., $N_{P\_}M$) in action 302, which occurs before the UE begins monitoring for the corresponding RAR in action 304.

In some implementations, the PRACH configuration may further indicate a second set of PRACH resources that is configured for an SP transmission. The SP transmission may include: the UE transmitting the RA preamble only once before the UE begins monitoring for the RAR that corresponds to the RA preamble. For example, according to FIG. 1, the UE transmits the RA preamble only once in action 102, which occurs before the UE begins monitoring for the corresponding RAR in action 104.

In some implementations, the PRACH configuration may be configured on a per-DL-RS basis. For example, according to FIGS. 4 and 7, each of the PRACH configurations, MP_PRACH 1, MP_PRACH 2, MP_PRACH 3, and MP_PRACH 4, is configured on a per-SSB basis.

In some implementations, the method 1300 may further include: the UE measuring a plurality of DL RSs to obtain a plurality of RSRP values; selecting, among the plurality of DL RSs, a DL RS for the RA procedure after determining that all of the plurality of RSRP values are less than an RSRP threshold; and transmitting the RA preamble on the first PRACH resource associated with the DL RS. The DL RS may correspond to a Tx beam of the BS. That is, the BS may receive the RA preamble on the first PRACH resource through the BS's Rx beam that is associated with/paired with the Tx beam. Taking FIG. 4 as an example, if the BS's Tx beam, SSB4, is selected by the UE, the BS may receive the RA preamble on an MP-specific PRACH resource through the BS's Rx beam Rx 4 that is associated with the Tx beam SSB4.

In some implementations, a second PRACH resource of the first set of PRACH resources corresponds to a second parameter of the plurality of parameters, and the second parameter indicates a second number of times to transmit the RA preamble, with the first parameter indicating the first number of times to transmit the RA preamble, the first number of times being different from the second number of times. For example, according to FIG. 7, MP-specific PRACH resource I corresponds to $N_{P\_}S$. $N_{P\_}S$ may indicate a different number of times to transmit the RA preamble than $N_{P\_}M$.

In some implementations, the method 1300 may further include: the UE receiving a plurality of RSRP thresholds from the base station, measuring a DL RS to obtain an RSRP value (where the DL RS may be associated with the first set of PRACH resources), and comparing the RSRP value with the plurality of RSRP thresholds to select the first PRACH resource, from the first set of PRACH resources, for the MP transmissions. For example, according to FIG. 8, the UE may receive multiple RSRP thresholds including RSRP threshold A and RSRP threshold B. The UE may compare the measurement result of a DL RS (e.g., the RSRP value of a DL RS) with these RSRP thresholds to determine which $N_p$ value and/or which (MP-specific) PRACH resource should be selected for MP transmissions.

In some implementations, the method 1300 may further include: the UE determining whether to change from the first PRACH resource to a second PRACH resource of the first set of PRACH resources for transmitting the RA preamble according to at least one of: the number of rounds in which the UE performs the MP transmissions and whether the MP transmissions performed in two consecutive rounds are associated with a same DL RS. Two consecutive rounds of MP transmissions may refer to two consecutive rounds of an RA preamble transmission step/stage during an ongoing RA procedure, which are separated by a random backoff.

In some implementations, the method 1300 may further include: the UE receiving a counter threshold for configuring a counter from a base station, monotonically changing a value of the counter after determining that the MP transmissions performed in two consecutive rounds are associated with the same DL RS, and selecting the second PRACH resource for transmitting the RA preamble after determining that the value of the counter has reached the counter threshold. For example, according to FIG. 12, the UE may receive a counter threshold for configuring a counter (e.g., MP_Counter) from the BS. The value of the MP_Counter may monotonically change (e.g., increases or decreases by a certain value step by step) when the MP transmissions performed in two consecutive rounds are associated with the same DL RS. Once the value of the MP_Counter has reached the counter threshold (e.g., the outcome of action 1208 is yes), the UE may select another MP-specific PRACH resource for MP transmissions.

In some implementations, a transmission power of transmitting the RA preamble on the second PRACH is higher than a transmission power of transmitting the RA preamble on the first PRACH resource.

According to method 1300, the UE is configured with multiple settings for MP transmissions (including a plurality of parameters and the corresponding (MP-specific) PRACH resources), allowing the UE to select an appropriate setting from among the multiple settings based on varying channel conditions and/or instructions from the base station, thus reducing unnecessary delay and power consumption caused by the execution of MP transmissions and optimizing the overall performance of the EUT scheme.

Figure 14:
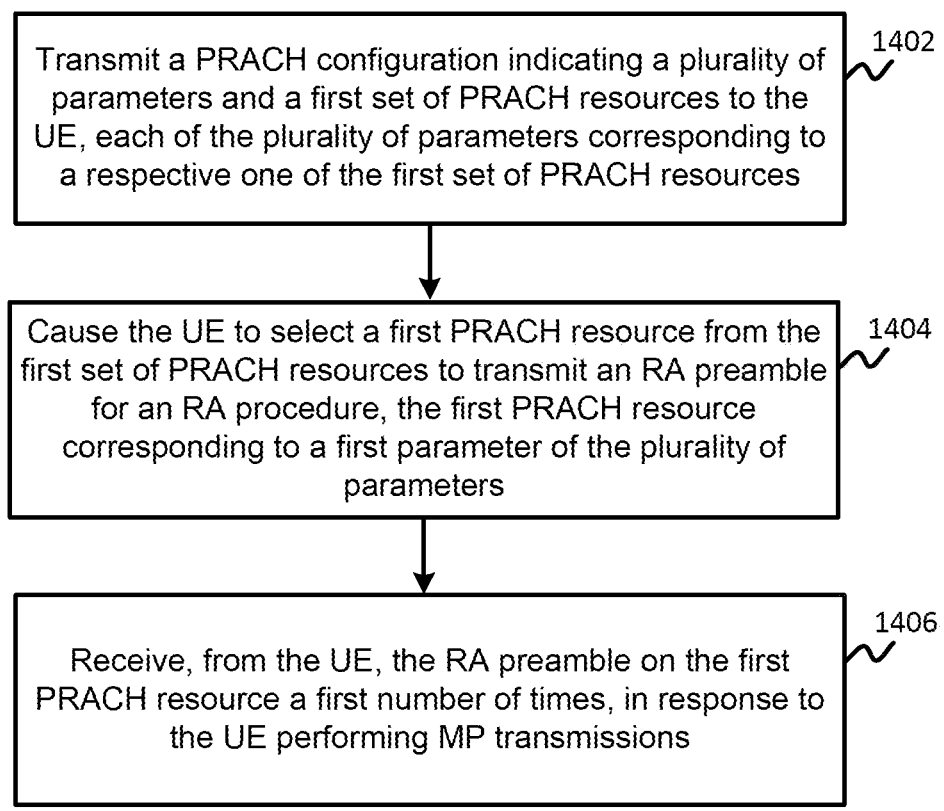
FIG. 14 is a flowchart of a method for communicating with a UE performing uplink transmissions, according to an example implementation of the present disclosure.

FIG. 14 is a flowchart of a method 1400 for communicating with a UE performing uplink transmissions, according to an example implementation of the present disclosure. Although actions 1402, 1404, and 1406 are illustrated as separate actions represented as independent blocks in FIG. 14, these separately illustrated actions should not be construed as necessarily order-dependent. The order in which the actions are performed in FIG. 14 is not intended to be construed as a limitation, and any number of the disclosed blocks may be combined in any order to implement the method, or an alternate method. Each of actions 1402, 1404, and 1406 may be performed independently of other actions, and can be omitted in some implementations of the present disclosure. Moreover, the method 1400 can be combined with other procedures/methods described in the present disclosure. The method 1400 is a process executed from the perspective of the BS, and it can be considered as corresponding to the method 1300 which is executed from the perspective of the UE.

In action 1402, a BS may transmit a PRACH configuration indicating a plurality of parameters and a first set of PRACH resources to the UE, each of the plurality of parameters corresponding to a respective one of the first set of PRACH resources.

In action 1404, the BS may cause the UE to select a first PRACH resource from the first set of PRACH resources to transmit an RA preamble for an RA procedure, the first PRACH resource corresponding to a first parameter of the plurality of parameters.

In action 1406, the BS may receive, from the UE, the RA preamble on the first PRACH resource a first number of times in response to the UE performing MP transmissions. The first set of PRACH resources may be configured for the UE to perform the MP transmissions. The first number of times may be determined by the first parameter.

In some implementations, the PRACH configuration may be configured on a per-DL-RS basis.

Figure 15:
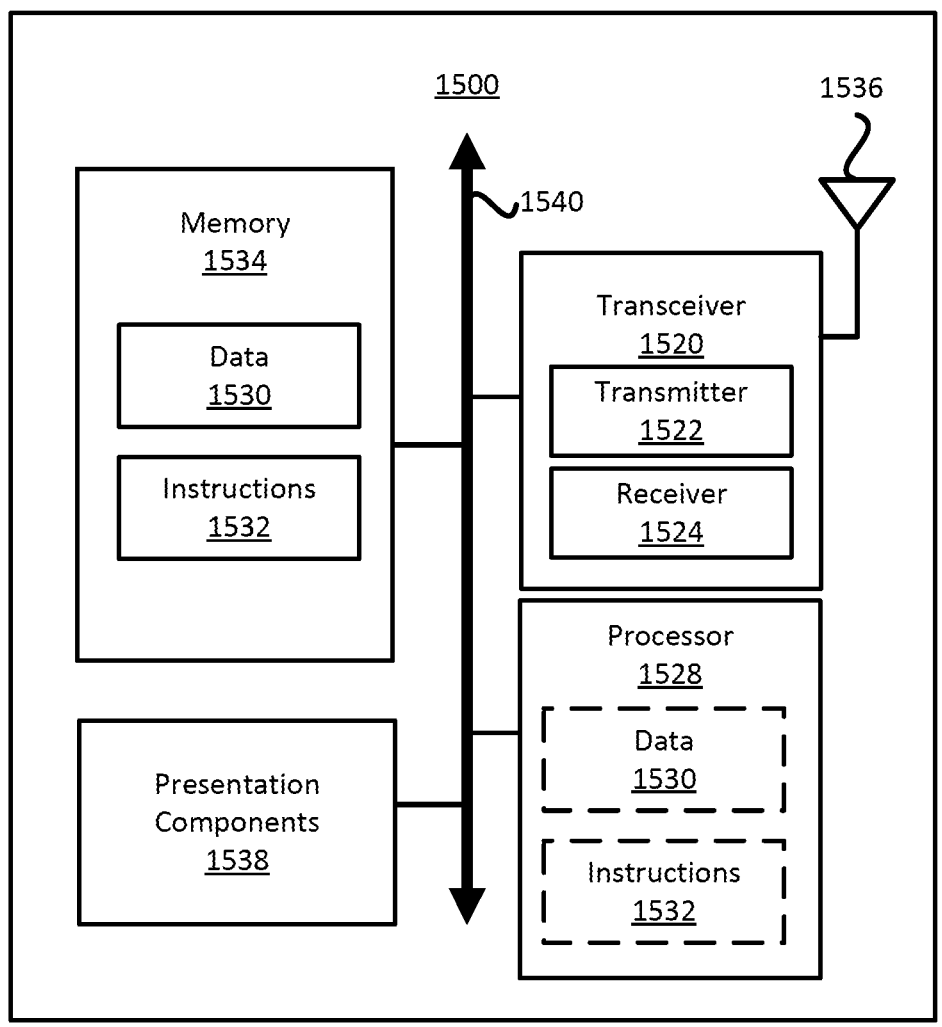
FIG. 15 is a block diagram illustrating a node for wireless communication, according to an example implementation of the present disclosure.

FIG. 15 is a block diagram illustrating a node 1500 for wireless communication, according to an example implementation of the present disclosure. As illustrated in FIG. 15, a node 1500 may include a transceiver 1520, a processor 1528, a memory 1534, one or more presentation components 1538, and at least one antenna 1536. The node 1500 may also include a radio frequency (RF) spectrum band module, a BS communications module, a network communications module, and a system communications management module, Input/Output (I/O) ports, I/O components, and a power supply (not illustrated in FIG. 15).

Each of the components may directly or indirectly communicate with each other over one or more buses 1540. The node 1500 may be a UE or a BS that performs various functions disclosed with reference to FIGS. 1 through 14.

The transceiver 1520 has a transmitter 1522 (e.g., transmitting/transmission circuitry) and a receiver 1524 (e.g., receiving/reception circuitry) and may be configured to transmit and/or receive time and/or frequency resource partitioning information. The transceiver 1520 may be configured to transmit in different types of subframes and slots including, but not limited to, usable, non-usable, and flexibly usable subframes and slot formats. The transceiver 1520 may be configured to receive data and control channels.

The node 1500 may include a variety of computer-readable media. Computer-readable media may be any available media that may be accessed by the node 1500 and include volatile (and/or non-volatile) media and removable (and/or non-removable) media.

The computer-readable media may include computer-storage media and communication media. Computer-storage media may include both volatile (and/or non-volatile media) and removable (and/or non-removable) media implemented in any method or technology for storage of information such as computer-readable instructions, data structures, program modules, or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules, or other data in a modulated data signal, such as a carrier wave, or other transport mechanisms and include any information delivery media.

The term "modulated data signal" may mean a signal that has one or more of its characteristics set or changed in such a manner as to encode information in the signal. Communication media may include wired media, such as a wired network or direct-wired connection, and wireless media, such as acoustic, RF, infrared, and other wireless media. Combinations of any of the previously listed components should also be included within the scope of computer-readable media.

The memory 1534 may include computer-storage media in the form of volatile and/or non-volatile memory. The memory 1534 may be removable, non-removable, or a combination thereof. Example memory may include solid-state memory, hard drives, optical-disc drives, etc. As illustrated in FIG. 15, the memory 1534 may store a computer-readable and/or computer-executable instruction 1532 (e.g., software codes or program(s)) that are configured to, when executed, cause the processor 1528 to perform various functions disclosed herein, for example, with reference to FIGS. 1 through 14. Alternatively, the instruction 1532 may not be directly executable by the processor 1528 but may be configured to cause the node 1500 (e.g., when compiled and executed) to perform various functions disclosed herein.

The processor 1528 (e.g., having processing circuitry) may include an intelligent hardware device, e.g., a Central Processing Unit (CPU), a microcontroller, an ASIC, etc. The processor 1528 may include memory. The processor 1528 may process the data 1530 and the instruction 1532 received from the memory 1534, and information transmitted and received via the transceiver 1520, the baseband communications module, and/or the network communications module. The processor 1528 may also process information to send to the transceiver 1520 for transmission via the antenna 1536 to the network communications module for transmission to a Core Network (CN).

One or more presentation components 1538 may present data indications to a person or another device. Examples of presentation components 1538 may include a display device, a speaker, a printing component, a vibrating component, etc.

In view of the present disclosure, various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are considered in all respects as illustrative and not restrictive. It should also be understood that the present disclosure is not limited to the specific implementations disclosed. Still, many rearrangements, modifications, and substitutions are possible without departing from the scope of the present disclosure.

What is claimed is:

1. A method for performing uplink transmissions by a User Equipment (UE), the method comprising:
   receiving, from a base station, a Physical Random Access Channel (PRACH) configuration indicating a plurality of parameters and a first set of PRACH resources, each of the plurality of parameters corresponding to a respective one of the first set of PRACH resources;
   initiating a Random Access (RA) procedure;
   measuring a plurality of Downlink (DL) Reference Signals (RSs) to obtain a plurality of Reference Signal Received Power (RSRP) values;
   selecting, among the plurality of DL RSs, a DL RS for the RA procedure after determining that all of the plurality of RSRP values are less than an RSRP threshold;
   selecting a first PRACH resource from the first set of PRACH resources to transmit an RA preamble for the RA procedure, wherein the first PRACH resource corresponds to a first parameter of the plurality of parameters and is associated with the DL RS selected for the RA procedure; and
   performing Multiple-PRACH (MP) transmissions on the first PRACH resource, the MP transmissions comprising transmitting the RA preamble a first number of times before the UE begins monitoring for a Random Access Response (RAR) that corresponds to the RA preamble, wherein:
      the first set of PRACH resources is configured for the MP transmissions, and
      the first number of times is determined by the first parameter.

2. The method according to claim 1, wherein the PRACH configuration further indicates a second set of PRACH resources that is configured for a Single-PRACH (SP) transmission, wherein the SP transmission comprises:
   transmitting the RA preamble only once before the UE begins monitoring for the RAR that corresponds to the RA preamble.

3. The method according to claim 1, wherein the PRACH configuration is configured on a per-DL-RS basis.

4. The method according to claim 1, wherein:
   a second PRACH resource of the first set of PRACH resources corresponds to a second parameter of the plurality of parameters,
   the second parameter indicates a second number of times to transmit the RA preamble, and
   the first number of times is different from the second number of times.

5. The method according to claim 1, further comprising:
   determining whether to change from the first PRACH resource to a second PRACH resource of the first set of PRACH resources for transmitting the RA preamble based on at least one of:
   a number of rounds in which the UE performs the MP transmissions, or
   whether MP transmissions performed in two consecutive rounds are associated with the DL RS.

6. The method according to claim 5, further comprising:
   receiving, from the base station, a counter threshold for configuring a counter;
   monotonically changing a value of the counter after determining that the MP transmissions performed in the two consecutive rounds are associated with the DL RS; and
   selecting the second PRACH resource for transmitting the RA preamble after determining that the value of the counter has reached the counter threshold.

7. The method according to claim 6, wherein a transmission power of transmitting the RA preamble on the second PRACH resource is higher than a transmission power of transmitting the RA preamble on the first PRACH resource.

8. A User Equipment (UE) for performing uplink transmissions, the UE comprising:
   at least one processor; and
   at least one non-transitory computer-readable medium coupled to the at least one processor and storing one or more computer-executable instructions that, when executed by the at least one processor, cause the UE to:

receive, from a base station, a Physical Random Access Channel (PRACH) configuration indicating a plurality of parameters and a first set of PRACH resources, each of the plurality of parameters corresponding to a respective one of the first set of PRACH resources;

initiate a Random Access (RA) procedure;

measure a plurality of Downlink (DL) Reference Signals (RSs) to obtain a plurality of Reference Signal Received Power (RSRP) values;

select, among the plurality of DL RSs, a DL RS for the RA procedure after determining that all of the plurality of RSRP values are less than an RSRP threshold;

select a first PRACH resource from the first set of PRACH resources to transmit an RA preamble for the RA procedure, wherein the first PRACH resource corresponds to a first parameter of the plurality of parameters and is associated with the DL RS selected for the RA procedure; and perform Multiple-PRACH (MP) transmissions on the first PRACH resource, the MP transmissions comprising transmitting the RA preamble a first number of times before the UE begins monitoring for a Random Access Response (RAR) that corresponds to the RA preamble, wherein the first set of PRACH resources is configured for the MP transmissions, and the first number of times is determined by the first parameter.

9. The UE according to claim 8, wherein the PRACH configuration further indicates a second set of PRACH resources that is configured for a Single-PRACH (SP) transmission, wherein the SP transmission comprises:

transmitting the RA preamble only once before the UE begins monitoring for the RAR that corresponds to the RA preamble.

10. The UE according to claim 8, wherein the PRACH configuration is configured on a per-DL-RS basis.

11. The UE according to claim 8, wherein:

a second PRACH resource of the first set of PRACH resources corresponds to a second parameter of the plurality of parameters, the second parameter indicates a second number of times to transmit the RA preamble, and the first number of times is different from the second number of times.

12. The UE according to claim 8, wherein the one or more computer-executable instructions, when executed by the at least one processor, further cause the UE to:

determine whether to change from the first PRACH resource to a second PRACH resource of the first set of PRACH resources for transmitting the RA preamble based on at least one of:

a number of rounds in which the UE performs the MP transmissions, or whether MP transmissions performed in two consecutive rounds are associated with the DL RS.

13. The UE according to claim 12, wherein the one or more computer-executable instructions, when executed by the at least one processor, further cause the UE to:

receive, from the base station, a counter threshold for configuring a counter from the base station;

monotonically change a value of the counter after determining that the MP transmissions performed in the two consecutive rounds are associated with the DL RS; and select the second PRACH resource for transmitting the RA preamble after determining that the value of the counter has reached the counter threshold.

14. The UE according to claim 13, wherein a transmission power of transmitting the RA preamble on the second PRACH resource is higher than a transmission power of transmitting the RA preamble on the first PRACH resource.

* * * * *